US012448308B2

(12) United States Patent
Nassar et al.

(10) Patent No.: US 12,448,308 B2
(45) Date of Patent: Oct. 21, 2025

(54) ENHANCED SETTLING AND DEWATERING OF OIL SANDS MATURE FINE TAILINGS WITH TITANOMAGNETITE NANOPARTICLES GRAFTED WITH POLYACRYLAMIDE AND LAURYL SULFATE

(71) Applicant: NanoWaterTech Inc., Calgary (CA)

(72) Inventors: Nashaat N. Nassar, Calgary (CA); Afif Hethnawi, Calgary (CA)

(73) Assignee: NanoWaterTech Inc. (CA)

( * ) Notice: Subject to any disclaimer, the term of this patent is extended or adjusted under 35 U.S.C. 154(b) by 477 days.

(21) Appl. No.: 17/879,892

(22) Filed: Aug. 3, 2022

(65) Prior Publication Data
US 2023/0094535 A1  Mar. 30, 2023

Related U.S. Application Data

(60) Provisional application No. 63/231,083, filed on Aug. 9, 2021.

(51) Int. Cl.
*C02F 1/52* (2023.01)
*C02F 1/56* (2023.01)
(Continued)

(52) U.S. Cl.
CPC .............. *C02F 1/5236* (2013.01); *C02F 1/56* (2013.01); *C02F 2001/007* (2013.01);
(Continued)

(58) Field of Classification Search
CPC .... C02F 1/5236; C02F 1/56; C02F 2001/007; C02F 2103/10; C02F 2305/04; C02F 2305/08
(Continued)

(56) References Cited

U.S. PATENT DOCUMENTS 2,881,171 A * 4/1959 Hankins .................... C02F 1/54
524/106
3,493,501 A * 2/1970 Eck ........................ C02F 1/54
210/732
(Continued)

FOREIGN PATENT DOCUMENTS

CN         1248177 A  *  3/2000  ................ A61P 5/14
CN       104383886 A      3/2015
(Continued)

OTHER PUBLICATIONS

Machine-generated English translation of CN 105566566, generated on Jan. 15, 2025.*

(Continued)

*Primary Examiner* — Fred Prince
(74) *Attorney, Agent, or Firm* — Deborah A. Peacock; Marco H. Santamaria; Peacock Law P.C.

(57) ABSTRACT

Nanoflocculants are provided that are comprised of nanoparticles of titanomagnetite having anionic surface moieties associated with electrostatically bound polymerized chains of cationic polyacrylamide, further comprising lauryl sulfate moieties adsorbed to the surface of nanoparticles of the titanomagnetite nanoparticles and/or adsorbed to the bound cationic polyacrylamide polymers. These nanoflocculants combine the dual functionalities of the polyacrylamide/lauryl sulfate moieties, as well as the surface activity of titanomagnetite nanomaterials. Process are provided for making and using the disclosed nanoflocculants, including uses for flocculating intimate aqueous dispersions of solids and bitumen.

10 Claims, 8 Drawing Sheets

(51) Int. Cl.
*C02F 1/00* (2023.01)
*C02F 103/10* (2006.01)

(52) U.S. Cl.
CPC ...... *C02F 2103/10* (2013.01); *C02F 2305/04* (2013.01); *C02F 2305/08* (2013.01)

(58) Field of Classification Search
USPC .................. 210/728, 729, 730, 732, 733
See application file for complete search history.

(56) References Cited

U.S. PATENT DOCUMENTS

| | | | |
|---|---|---|---|
| 3,562,153 A | | 2/1971 | Tulley et al. |
| 3,666,810 A | * | 5/1972 | Hoke ................ C02F 1/54 |
| | | | 526/292.9 |
| 8,551,431 B1 | | 10/2013 | Adams et al. |
| 10,336,932 B1 | * | 7/2019 | Bai .................. C09K 8/426 |
| 2006/0257485 A1 | * | 11/2006 | Kumacheva ......... C08G 83/001 |
| | | | 424/490 |
| 2014/0251806 A1 | | 9/2014 | Larson et al. |
| 2016/0280572 A1 | * | 9/2016 | Zeng ................ C02F 1/56 |
| 2021/0395123 A1 | * | 12/2021 | Labarre ............ C09K 8/528 |

FOREIGN PATENT DOCUMENTS

| | | | | | |
|---|---|---|---|---|---|
| CN | 105566566 A | * | 5/2016 | | |
| CN | 108609704 A | * | 10/2018 | | |
| CN | 108658193 A | * | 10/2018 | ........... | C02F 1/488 |
| CN | 111747498 A | * | 10/2020 | | |
| CN | 112624290 A | * | 4/2021 | ........... | C02F 1/5236 |
| CN | 113072151 A | * | 7/2021 | ........... | C02F 1/5236 |
| JP | 2014034006 A | * | 2/2014 | | |
| KR | 20210121605 A | * | 10/2021 | | |
| WO | WO-2019214065 A1 | * | 11/2019 | ........... | C02F 1/281 |

OTHER PUBLICATIONS

Machine-generated English translation of CN 108609704, generated on Jan. 15, 2025.*
Machine-generated English translation of CN 111747498, generated on Jan. 15, 2025.*
Machine-generated English translation of WO 2019/214065, generated on Jan. 15, 2025.*
Machine-generated English translation of CN 112624290, generated on Jan. 15, 2025.*
Machine-generated English translation of CN 108658193, generated on Jan. 15, 2025.*
Machine-generated English translation of KR 20210121605, generated on Jan. 15, 2025.*
Machine-generated English translation of CN 113072151, generated on Jan. 15, 2025.*
Machine-generated English translation of JP 2014034006, generated on Jun. 3, 2025.*
Machine-generated English translation of CN 1248177, generated on Jun. 3, 2025.*
Jumadi et al., A review of nano-based materials used as flocculants for water treatment, Apr. 22, 2020, International Journal of Environmental Science and Technology, 17:3571-3594.*
Ma et al., Magnetic flocculants synthesized by Fe3O4 coated with cationic polyacrylamide for high turbid water flocculation, Jul. 2, 2018, Environmental Science and Pollution Research 25:25955-25966.*
Ciftci, T.D., "Adsorptive properties of Fe3O4/Ni/NixB nanocomposite coated nutshell for the removal of arsenic (iii) and arsenic (V) from waters", Cogent Chemistry, vol. 3, No. 1, 2017, 1284296.

* cited by examiner

ENHANCED SETTLING AND DEWATERING OF OIL SANDS MATURE FINE TAILINGS WITH TITANOMAGNETITE NANOPARTICLES GRAFTED WITH POLYACRYLAMIDE AND LAURYL SULFATE

CROSS-REFERENCE TO RELATED APPLICATIONS

This application claims benefit of priority to U.S. Provisional Patent Application No. 63,231,083 entitled, "ENHANCED SETTLING AND DEWATERING OF OIL SANDS MATURE FINE TAILINGS WITH TITANOMAGNETITE NANOPARTICLES GRAFTED WITH POLYACRYLAMIDE AND LAURY SULFATE" filed Aug. 9, 2021. The entire contents and disclosures of this patent application is incorporated herein by reference in its entirety.

FIELD OF THE INVENTION

The invention is in the field of material separations, in particular separating solid material from water, including the separation of the components of tailings waste streams from oilsands mining operations. Processes are provided for the flocculation/destabilization of mature fine tailings (MFT) using nanoflocculants made from polymerized chains of hydrophobically modified polyacrylamide with lauryl sulfate segments, that is grafted to the surface of nanoparticles of titanomagnetite.

BACKGROUND

Bitumen extraction from oil sands deposits is a water intensive process that typically generate waste tailings that cause technical and environmental challenges.[1-5] With in-situ extraction process, an average of 0.4 barrels of fresh water is typically needed to recover each barrel of bitumen, while oil sands surface mining process uses 3 to 4 barrels of high-quality water for each barrel of oil produced.[3,6,7] In Alberta, most of the high-quality water (around 80%) used for mining operations is typically recycled from the production process, while the rest is withdrawn from the Athabasca river.[3,7] However, relying on resources from the Athabasca river's natural flow is not possible throughout the year and can be limited from season to season. Accordingly, considerable efforts have been made to maximize water reuse from the production process by reducing the quantity of tailings.[8,9] In surface mining operations, tailing ponds are generated as by-products of sequential hot water processes from slurry preparation plants.[10] In the ponds, heavier sand particles separate out from the accumulated slurry and settle down at a high rate, while the remaining fine sand particles and clay stay suspended in the center of the pond for a long time and form mature fine tailings (MFT).[11-13] Around 86% of the volume of MFT contains water that cannot be easily recycled, because of the presence of stable sand particles (very fine, negatively charged clays that cannot be separated from water by gravity); these sand particles form a vastly disproportional amount of slurries that are stubborn and take several decades to consolidate after placement.[11-13] To address this challenging issue, tremendous efforts, with varying levels of success and feasibility, have been proposed to speed up the settling rate of the fine particles in MFT and maximize the water recovery rate for reuse in the industry.[14,15] These efforts were based on natural, biological treatment, physical/mechanical, and chemical techniques.[14,15] The natural and biological techniques are inappropriate all the times, since they depend on the local climate conditions. On the other hand, the physical/mechanical techniques are either labor and energy-intensive or time-consuming methods. Finally, the chemical treatment with introducing effective coagulants and flocculants remained as the most popular processes to enhance settling and consolidation of MFT[16-20]. In the industry, classical coagulation (consolidated tailing process, CT), followed by flocculation steps (paste tailing process) are successively applied to enhance the separation and consolidation of MFTs.[17,19-23] In such steps, extensive amounts of gypsum and high molecular weight polymeric flocculants are conventionally utilized.[17,19-23] With introducing gypsum (around 800-1200 $g/m^3$ of extraction tailings), as coagulant aid, the negatively charged particle can be neutralized in presence of calcium cations, forming unstable non-segregating deposits that tends to consolidate quickly and release additional water.[24-26] In spite of that, re-utilization of the recycled produced water using CT process in the bitumen extraction process, due to presence of high concentrations of divalent ions, is impeded.[27] Besides, the generated metal-based sludges are complex and have another environmental and human health implications.[27] The paste technology processes, on the other hand, rely heavily on flocculation performance of the commercial flocculants of polyacrylamide (PAM) to enhance the water solid separation in the MFTs.[17,19-23,27] Unfortunately, PAM-induced floccules are loosely packed and settled slowly, since they are not able to reasonably flocculate the fine tailing particles.[17,19-23,27] More precisely, the backbone of PAM contains amide groups, which contribute in generating strongly bonded gel-like polymeric networks that retain large volumes of water, with poorly consolidating sediments.[17,19,22] To alleviate these issues, many studies focused their efforts on structurally modifying the PAM to dewater MFT more effectively than the commercial PAM, such as the following.[16,18,28]

Bonding positively charged inorganic groups, such as $Al(OH)_3$, to the backbone of the PAM structure, in order to create organic-inorganic hybrid polymeric flocculants (i.e. Al-PAM).[29,30] These hybrid polymeric flocculants were considered as effective filtration aid that successfully flocculated/densified a diluted suspension of MFT (10 wt % solids) and produced virtually solids-free filtrate.[30]

Forming thermo-sensitive polymeric flocculants,[19,31] such as N-isopropylacrylamide (NIPAm) and 2-aminoethyl methacrylamide hydrochloride (AEMA). These co-polymers can be transformed to a more hydrophobic polymers upon varying the flocculation conditions (i.e., temperature, pH, and gas concentration), leading to produce more compact MFT sediments.[19,31]

Copolymerizing the acrylamide (AC) with other monomers that have hydrophobic moieties, such as diallyldimethylammonium chloride (DADMAC), [2-(acryloyloxy)-ethyl]trimethylammonium chloride, or propylene oxide (PO).[18] These hydrophobically modified copolymers implied better flocculation performance, due to presence of stronger electrostatic forces between positively charged polymer and negatively charged particles.[17]

Despite positive results achieved from structurally modifying PAM-based polymeric flocculants, some challenges associated with their synthesis and application remain. In particular, (1) their synthesis is not economically feasible and depends on several complex steps.[17,19,29-31] Additionally, (2) considerable quantities or high molecular weights of these polymeric flocculants are needed to achieve the required level of flocculation, which also minimizes their dispersion in aqueous conditions.[17,19,29-31]

SUMMARY

Disclosed herein are nanoflocculants with demonstrated ability to connect multiple chains of hydrophobically grafted segments of polyacrylamide (PAM) and sodium laurel sulfate (PAM/SLS). The present nanoflocculants are made from polymerized chains of PAM that are electrostatically associated with anionic surface moieties on the surface of nanoparticles of titanomagnetite (NTM), further comprising lauryl sulfate moieties adsorbed to the surface of the NTM and/or adsorbed to the bound PAM. These nanoflocculants combine the advantages of (1) the dual functionality of the structure of PAM/SLS and (2) the surface activity of titanomagnetite nanomaterials. The NTM were initially produced by coprecipitation methods. Then, these NTM, as powder, were grafted with diverse quantities of PAM and SLS under ambient conditions. The effects of grafting differing amounts of PAM and SLS on flocculation performance (initial settling rate (ISR), sludge volume index (SVI), supernatant turbidity, capillary suction time (CST), and specific resistance to filtration (SRF)) of a MFT suspension with 15 wt % solids was statistically investigated by response surface methodology (RSM). The analysis of variance (ANOVA) results showed that the amounts of PAM and SLS are the most important factors influencing the flocculation performance with insignificant interaction effects. Thus, the optimized nanoflocculants for this embodiment were those grafted with greater amounts of PAM/SLS. Compared to many reported cationic polymeric flocculants, the present optimized nanoflocculants provided much higher ISR, supernatant turbidity as low as 42 NTU, CST value as low as 22 s and SRF as low as $2.5 \times 10^{10}$ m/Kg. Flocculation of a MFT suspension by applying 3000 ppm of the present optimized nanoflocculants, compared to 20,000 ppm of a commercial anionic polyacrylamide, provided 15 times faster ISR and half values of supernatant turbidity, CST, and SRF.

Select embodiments provide flocculating agents comprising a plurality of titanomagnetite nanoparticles having an average size of less than about 100 nm, the titanomagnetite nanoparticles having a surface comprising anionic surface moieties associated with electrostatically bound cationic polyacrylamide polymers, further comprising lauryl sulfate moieties adsorbed to the bound cationic polyacrylamide polymers and/or adsorbed to the surface of the titanomagnetite nanoparticles. The ratio by weight of the lauryl sulfate moieties to the polyacrylamide polymers ($wt_{LS}/wt_{PAM}$) may for example be greater than about 0.01 and/or less than about 0.1. The titanomagnetite nanoparticles may for example have an average crystalline domain size of from about 10 to about 40 nm, or from about 20 to about 30 nm, or of less than about 90 nm, or of less than about 80 nm, or of less than about 70 nm, or of less than about 60 nm, or of less than about 50 nm, or of less than about 40 nm.

In some embodiments of the flocculating agent, the $wt_{LS}/wt_{PAM}$ may for example be greater than about 0.015, or greater than about 0.02, or greater than about 0.022, or greater than about 0.025, or greater than about 0.03, or greater than about 0.035, or greater than about 0.037. Alternatively, the $wt_{LS}/wt_{PAM}$ may for example be less than about 0.09, or less than about 0.08, or less than about 0.075, or less than about 0.07, or less than about 0.06, or less than about 0.05, or less than about 0.046, or less than about 0.04. In further alternative embodiments, the $wt_{LS}/wt_{PAM}$ may for example be from 0.022 to 0.075, or from 0.022 to 0.074, or from 0.037 to 0.074, or from 0.02 to 0.046. In exemplary embodiments described herein, the $wt_L S/wt_{PAM}$ can for example be estimated from the TGA results, with a resulting range of $Wt_{LS}/Wt_{PAM}$ from 0.022 to 0.075 by varying the amount of monomer from 6 to 18 g and surfactant from 1.6 to 3.6 g (i.e. using 6 g of monomer and the surfactant from 1.6-3.6, the resulting range of $Wt_{LS}/Wt_PA$ was from 0.022 to 0.074; alternatively, using of 11 g of monomer and surfactant from 1.6-3.6 g, the resulting range of $Wt_{LS}/Wt_{PAM}$ was from 0.037 to 0.074; alternatively, using of 11 g of monomer and a surfactant amount from 1.6 to 3.6 g, the resulting range of $Wt_{LS}/wt_{PAM}$ was from 0.02-0.046).

In select embodiments, the flocculating agent may for example be characterized by a ratio by weight of polyacrylamide monomers to the titanomagnetite nanoparticles ($wt_{PA}/wt_{NTM}$) is greater than or equal to 0.1, 0.11, 0.12, 0.13, 0.14, 0.15, 0.16, 0.17, 0.18, 0.19 or 0.2; and/or less than or equal to 0.5, 0.45, 0.4, 0.35, 0.3 or 0.25; or from 0.15 to 0.35; or from 0.16 to 0.33.

In select embodiments, the flocculating agent may for example be characterized by a ratio by weight of the lauryl sulfate moieties to the titanomagnetite nanoparticles ($wt_{LS}/wt_{NTM}$) is greater than or equal to 0.3, 0.35, 0.4, 0.45, 0.5, 0.55 or 0.6; and/or less than or equal to 0.9, 0.95, 1, 1.05, 1.1, 1.15, 1.20, 1.25, 1.33, 1.35, 1.40, 1.45 or 1.5; or from 0.5 to 1.3; or from 0.53 to 1.2.

Process are also provided for making flocculating agents, for example process that involve: mixing protonated polyacrylamide monomers in an acidic coating media with titanomagnetite nanoparticles, to form titanomagnetite nanoparticles having a surface comprising anionic surface moieties associated with electrostatically bound polyacrylamide moieties; initiating polymerization of the polyacrylamide moieties on the surface of the titanomagnetite nanoparticles by persulfate addition to the coating media to form polymerization radical initiators attached to the surface of the titanomagnetite nanoparticles in a polymerization media; maintaining conditions in the polymerization media so as to propagate polyacrylamide polymers from the polymerization radical initiators to form titanomagnetite nanoparticles having anionic surface moieties associated with electrostatically bound polyacrylamide polymers in a grafting media; and, adding sodium lauryl sulfate to the titanomagnetite nanoparticles in the grafting media to adsorb lauryl sulfate moieties onto the polyacrylamide polymers and/or onto the surface of the titanomagnetite nanoparticles, to form the flocculating agent.

In select implementations of the present processes for making flocculating agents, the titanomagnetite nanoparticles may for example have an average size of less than about 100 nm. Alternatively, the titanomagnetite nanoparticles may have an average crystalline domain size of from about 10 to about 40 nm, or from about 20 to about 30 nm, or of less than about 90 nm, or of less than about 80 nm, or of less than about 70 nm, or of less than about 60 nm, or of less than about 50 nm, or of less than about 40 nm.

In select implementations of the present processes for making flocculating agents, the ratio by weight of the lauryl sulfate moieties to the polyacrylamide polymers ($wt_{LS}/wt_{PAM}$) is greater than about 0.01 and/or less than about 0.1. Alternatively, the $wt_L S/wt_{PAM}$ may for example be greater than about 0.015, or greater than about 0.02, or greater than about 0.022, or greater than about 0.025, or greater than about 0.03, or greater than about 0.035, or greater than about 0.037. In further alternatives, the $wt_L S/wt_{PAM}$ may be less than about 0.09, or less than about 0.08, or less than about 0.075, or less than about 0.07, or less than about 0.06, or less than about 0.05, or less than about 0.046, or less than about 0.04. Alternatively, the $wt_{LS}/wt_{PAM}$ may be from 0.022 to 0.075, or from 0.022 to 0.074, or from 0.037 to 0.074, or from 0.02 to 0.046.

In select implementations of the present processes for making flocculating agents, the ratio by weight of polyacrylamide monomers to the titanomagnetite nanoparticles ($wt_{PA}/wt_{NTM}$) may for example be greater than or equal to 0.1, 0.11, 0.12, 0.13, 0.14, 0.15, 0.16, 0.17, 0.18, 0.19 or 0.2; and/or less than or equal to 0.5, 0.45, 0.4, 0.35, 0.3 or 0.25; or from 0.15 to 0.35; or from 0.16 to 0.33.

In select implementations of the present processes for making flocculating agents, the ratio by weight of the lauryl sulfate moieties to the titanomagnetite nanoparticles ($wt_{LS}/wt_{NT}M$) is greater than or equal to 0.3, 0.35, 0.4, 0.45, 0.5, 0.55 or 0.6; and/or less than or equal to 0.9, 0.95, 1, 1.05, 1.1, 1.15, 1.20, 1.25, 1.33, 1.35, 1.40, 1.45 or 1.5; or from 0.5 to 1.3; or from 0.53 to 1.2.

Processes are also provided for treating a slurry comprising an intimately dispersed mixture of water, bitumen, and fine solid particles. The slurry may for example be characterized by a water content of 40%-60% (or 50-55%), and/or a slurry bitumen content of 1-15% (or 4-6%), and/or a slurry solids content of 20-50% (or 35-45%). The process may involve treating the slurry, or a diluted slurry, or a concentrated slurry, with the flocculating agent disclosed herein. One or more of the slurry water, bitumen and/or solids content may for example be determined by Dean-Stark extraction. The flocculating agent may for example be added to the slurry, the diluted slurry or the concentrated slurry, at a concentration of 2000-6000 ppm or 3000-5000 ppm. These processes may accordingly involve diluting the slurry with water to produce the diluted slurry or dewatering the slurry to produce the concentrated slurry.

DETAILED DESCRIPTION

Figure 1:
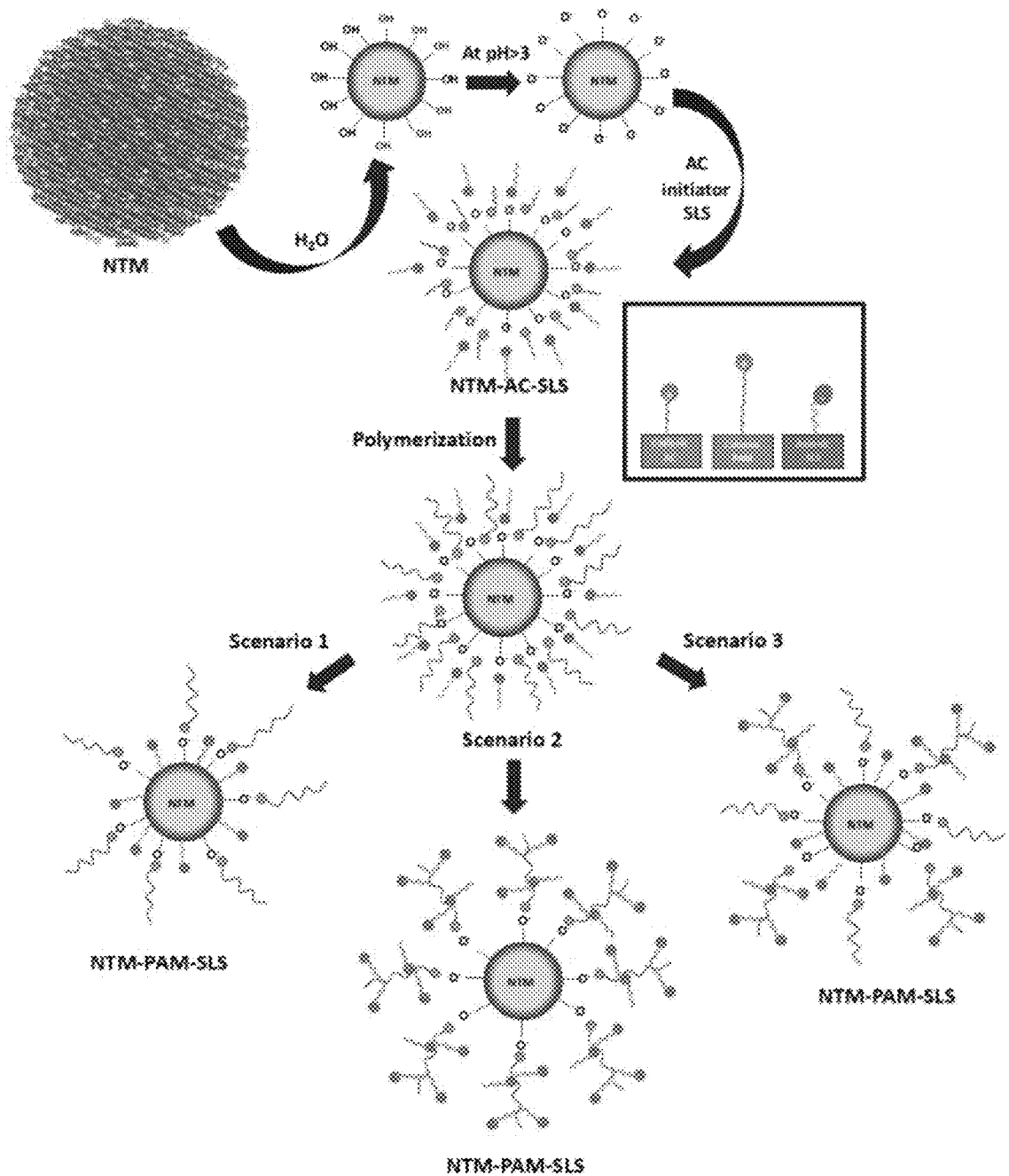
FIG. 1 Schematic representation for the synthesis steps and grafting of PAM/SLS onto the surface of NTM nanoparticles.

Nanoflocculants are disclosed herein with demonstrated ability to connect multiple chains of hydrophobically grafted PAM. These nanoflocculants contain polymerized chains of cationic PAM grafted with lauryl sulfate (SLS) segments, electrostatically bonded to the surface of nanoparticle of titanomagnetite (NTM), commercially known as iron sand, which is a naturally occurring mineral. These nanoflocculants combine the advantages of (1) the dual functionality of the structure of PAM/SLS and (2) the surface activity of titanomagnetite nanomaterials.[32] The dual functionality of PAM/SLS mixture facilitates destabilization of flocculated solid particles and reduces, and in some embodiments approximately eliminates, the water retained inside the flocs formed during MFT coagulation/flocculation and consolidation. The NTM were initially produced by coprecipitation methods. Then, these NTM, as powder, were grafted with diverse quantities of PAM and SLS at ambient conditions.

We statistically optimized the synthesis conditions for the nanoflocculants by response surface methodology (RSM) to illustrate the effects of grafting conditions on the flocculation behavior of the nanoflocculants, testing initial settling rate (ISR), supernatant turbidity, capillary suction time (CST) and surface resistance to filtration (SRF). By the RSM, we modeled the resulting responses with a multiple linear regression model, which allowed us to segregate the effect of each factor and to determine the significant effects of quadratic or interaction terms.[33] The presence of titanomagnetite nanoparticles is expected to confer unique features on the performance of the nanoflocculant, as it facilitates the grafting/functionalization of more than one segment (i.e., hydrophobic and hydrophilic) on the same surface, increases the flocs density with far less polymer coagulant, and due to the dispersibility feature of nanoparticles, it provides internal networking between MFT particles and PAM grafted nanoparticles, which facilitates dewatering. The cationic tips of the resulting PAM grafted nanoparticles are able to destabilize the clay particles present in the MFT by neutralizing the surface charge of the particles. While the SLS provides hydrophobic segments that enhance dewaterability of the sediments over time by forming bridges between individual particles. In some embodiments, using the present nanoflocculants to enhance settling and dewatering of MFT will eliminate the need for consolidated tailing processes of the kind that are typically employed in conventional techniques. Hence, this innovative treatment process provides more efficient and environmentally friendly approaches than conventional treatment processes and opens new possibilities for nanoparticle application in oil sand process affected water (OSPW) treatment.

EXAMPLES

Materials and Methods

Materials

The following chemicals were purchased for preparing the titanomagnetite nanoparticles ($Fe_{\sim2.5}Ti_{\sim0.5}O_4$): Iron(II) ammonium sulfate hexahydrate ($(NH_4)_2Fe(SO_4)_2 \cdot 6H_2O$, 99%), ammonium hydroxide ($NH_4OH$, 28-30% $NH_3$), titanium tetra-chloride ($TiCl_4$, 97%), and hydrogen peroxide ($H_2O_2$, 30-35%). The grafting of nanoparticles was accomplished by using the following chemicals: Acrylamide (AC, ≥99% (HPLC)), ammonium persulfate (APS, ≥98), nitric acid ($HNO_3$, 70%), and sodium laurel sulfate (SLS, ≥99.0% (GC)). All the aforementioned chemicals were purchased from Sigma-Aldrich, Ontario, Canada, and used as received without further modifications. The raw mature fine tailing sample (MFT, 42% solids by mass) was kindly provided from a local industrial partner in Calgary, Canada and used for the flocculation and dewatering experiments. For comparison purposes, a high molecular weight anionic polyacrylamide (PAM, molecular weight is range of 11-14 MDa), that is typically applied to enhance settling and consolidation of oil sand tailings, was kindly provided from a local industrial partner in Calgary, Canada.

Methods

Synthesis of Titanomagnetite Nanoparticles

The nanoparticles of titanomagnetite (NTM, $Fe_{\sim2.5}Ti_{\sim0.5}O_4$) were synthesised by the coprecipitation method at room temperature. In brief, an aqueous solution of iron was prepared by solubilizing 6 g of $(NH_4)_2Fe(SO_4)_2 \cdot 6H_2O$ in 100 mL deionized water (conductivity=0.055 µS), under magnetic stirring at 300 rpm for 5 min. After that, around 15 drops of $TiCl_4$ and 5 mL of $NH_4OH$ were separately added under magnetic agitation at 300 rpm. Then, few drops of $H_2O_2$, as oxidizing agent, were gradually added to the mixture, till achieving a blackish color mixture. After that, the resulting blackish mixture of titanomagnetite was homogenized for 20 min, filtered, and washed with deionized water. Lastly, the mixtures were dried at room temperature, yielding around 1.5 g of powdered titanomagnetite nanoparticles (NTM).

Grafting NTM with Polyacrylamide (PAM)/Sodium Laurel Sulfate (SLS)

After drying, the produced NTM nanoparticles were grafted with PAM/SLS chains at room conditions as schematically described in FIG. 1. These steps include: (1) protonation of acrylamide (AC) (2) grafting of the as-protonated AC monomers on the surface of NTM via electrostatic interactions with negative charges localized on the NTM surface, (3) radical polymerization of AC monomers grafted on NTM surface using free radicals of sulfate ($SO4^{\cdot-}$), which created from the initiator of APS under aqueous conditions, and (4) adsorbing of SLS molecules on PAM-grafted NTM, which allows SLS molecules to interact with NTM surface and/or the unoccupied PAM backbone to yield a highly hydrophobic polymer for efficient MFT treatment.

In detail, the surface of NTM, because of coordination and dissociation with water, is dominated by hydroxyl groups in an aqueous medium, which leads to protonation and formation of positive surface charges ($Fe^{+3}$—$OH^{+2}$) below the isoelectric point (IEP) and deprotonation and the formation of negative surface charges ($Fe^{+3}$—$O^-$) above the IEP.[34,35] Near the IEP, which was observed at pH around 3 (<IEP of magnetite since iron is more electronegative than Ti, the presence of Ti, even at low concentration, would increase the partial atomic charge of oxygen, resulting in lower zeta potential), the surface charge density of the nanoparticles is too small, and the particles are not stable in water and simultaneously form aggregats.[35,36] Therefore, to obtain stable NTM, both electrostatic and steric stabilization were introduced by anchoring AC or SLS molecules, as shown in FIG. 1.[35,36] AC, on the other hand, exits in form of neutral, N-protonated, and O-protonated according to the medium pH, as validated by the DFT-calculated IR spectrum amide.[37,38] In our present study, AC, under acidic conditions, tends to be N-protonated, as confirmed by our obtained infrared (IR) spectroscopy that was compared with that of DFT-calculated IR (see FIG. S1). Thus, N-protonated AC allows for charge dipole attraction with surface of NTM, generating NTM grafted with protonated AC (NTM-AC).[37,38] Next, ammonium persulfate (APS), followed by SLS, were added to the grafted nanoparticles to initiate the free radical polymerization and anchoring of SLS molecules. During the polymerization, the process of chain initiation involves two major steps; the first being the decomposition of APS to yield a pair of free radical species of $SO4^{\cdot-}$, as shown below:[39]

$$S_2O_8^{2-}{}_{(aq)} \longrightarrow 2SO_4^{\cdot-}{}_{(aq)} \tag{1}$$

The second step is the addition of monomer to the primary radical to yield the chain radicals, which initiate the polymerization. These chain radicals tend to be propagated and terminated by successive addition of the monomer molecules to the primary chain until consuming all the monomer presented in the solution. With addition of the anionic surfactant molecules to the surface of grafted nanoparticles, four sequential adsorption steps could be carried out as suggested by Scamehorn et al (1982).[40] In the first step, the surfactant molecules are interacted on the surface of nanoparticles via ion exchange.[40] Then, the surfactant molecules are converted to admicellar structures and then getting adsorbed on the nanoparticle surface by lipophilic interactions.[40] In the third step, surfactant adsorption is less favorable because the surfactant assembly is crowded, causing steric repulsion among neighbouring surfactants hinder the adsorption process and finally, the adsorption process is terminated when the equilibrium concentration of the surfactant molecules reaches or surpasses the critical micelle concentration (CMC) of the surfactant.[40] Accordingly, surfactant molecules were adsorbed on the surface of the neat surface of NTM and/or grafted chains of PAM through three possible scenarios as schematically presented in FIG. 1.

Experimentally, the first step was accomplished by adding fixed amounts of NTM to 60 mL of deionized water inside a sealed glass container. The container was placed in an ice bath to lower the temperature to 5° C. Then, few drops of $HNO_3$ (70%) were gradually added to reduce the pH to 4. After that, about 3 g of NTM nanoparticles were added to the solution under magnetic stirring at 300 rpm for 20 min. Such conditions allow to form cationic AC with protonated amine groups, which tends to preliminary graft on the surface of NTM nanoparticles. After grafting, the initiator was injected into the above solution after removing the dissolved oxygen molecules to generate primary radicals on the surface of the NTM nanoparticles for further PAM grafting. Therefore, the whole mixture was transferred into a 500-mL Schlenk flask along with extra 60 mL deionized water. Afterward, the mixture inside the flask was degassed by conducting two cycles of freeze-pump-thaw using liquid nitrogen and under vacuum conditions for 30 min. Thereafter, the temperature of the degassed mixture was raised up to 40° C. Then, around 0.125 g of ammonium persulfate (APS) were added to the mixture followed by appropriate amount of SLS (<6 mol % with respect to the AC), along with another 200 mL deionized water under magnetic stirring at 300 rpm for 20 min. Then, as time passes, the free radical polymerization is initiated, propagated, and terminated causing the mixture to become thicker, indicating the building of the PAM chains grafted on the nanoparticle surface. After 20 min, the stirring was stopped and the mixture transferred to a 500-mL beaker, where the mixture settled down. After settling, the mixture was decanted, washed two times, and dried under vacuum to form the grafted nanoparticles with PAM/SLS. Different samples of the nanoflocculants were synthesized according to response surface methodology (RSM) as will be described in the upcoming sections by varying the quantities of monomer ($X_1$: 6-18 g of AC), and surfactant ($X_2$:1.6-3.6 g of SLS). Then, the synthesized nanoflocculants were then used to test the flocculation performance as explained in the upcoming sections. More grafted nanoparticles were also synthesised by varying the used amount of monomer from 6 to 18 g without involving the fourth step (absence of SLS), in order to characterize the functionality and loading amount of monomer and surfactant. After selecting the optimum grafting conditions, an extra effort was made to compare the optimized nanoflocculant with a commercially anionic PAM (CAP) as well as another flocculant made from PAM/SLS mixture. It is worth to mention that the PAM/SLS mixture was synthesized following the aforementioned method in absence of nanoparticles by using quantities of PAM and SLS similar to that obtained in our optimal nanoflocculant.

Characterization of Nanoflocculants

An array of characterization techniques, including high resolution transmission electron microscopy (HRTEM), X-ray diffraction (XRD), infrared (IR) spectroscopy, and thermogravimetric analysis (TGA), and analytical high-resolution X-ray photoelectron spectroscopy (XPS) was applied for the synthesized materials. In details, the particle size and morphology before and after grafting the nanoparticles with PAM/SLS was observed by the HRTEM. Each sample for HRTEM analysis was prepared as follows: 0.5 mg of each sample was dispersed into 4 mL of pure ethanol. Then, few drops from the suspended solution were deposited into formavar/carbon copper grid sample holder. After drying, observations were carried out using a FEI Tecnai F20 FEG TEM with an accelerating voltage of 200 kV. Crystallographic identifications of the as-prepared powder samples were also investigated by the XRD using Ultima III Multipurpose Diffraction system (Rigarkucorporation, The Woodlands, TX, the USA) with Cu Kα radiation as the X-ray source at 40 kV and 44 mA with a θ-2θ goniometer. Around 5 mg of every sample was analyzed by loading and uniformly distributing it in a glass top-loaded holder (0.5 mm depth cavity) by using a microscope slide. Then, the sample was subjected to X-ray scans with 2θ range of 1-90° using a 0.020 step and a counting time of 1° $min^{-1}$. The XRD results are obtained and computed in form of XRD patterns. The organic functional groups, molecular interactions and bonds between the groups for the prepared powder samples were identified by the IR spectroscopy (Shimatzu® FTIR spectrophotometer model IRAffinity-US 120 VE). Before analyzing each sample by the IR, 5 mg of KBr was run to be used as reference. Then, tiny amount of each sample (~3 mg) was mixed with KBr and packed into a sample holder for the analysis. After that, the infrared fingerprint for each sample was obtained and identified at framework region of 4000-400 cm 1. To quantify the organic contents on the nanoparticles after grafting them with PAM/SLS (i.e., loading amounts of PAM/SLS), TGA analysis was carried out. For the analysis, a small amount of each sample (~5 mg) was heated up to 1173 K under an air flow rate of 100 $cm^3$/min and a heating rate of 10 K/min using a simultaneous thermogravimetric analysis/differential scanning calorimetry (TGA/DSC) analyzer (SDT Q600, TA Instruments, Inc., New Castle, DE).

In addition, surface chemistry of NTM before and after grafting with AC, PAM, and SLS was investigated by XPS analysis. The XPS tests were performed in the Ontario Centre for the Characterization of Advanced Materials (OC-CAM) facilities at the University of Toronto by using a Theta-probe Thermo-Fisher Scientific Instrument (East Grinstead, UK) that is equipped with a monochromatic Al Kα source with a photo energy 1486.6 eV. After a preliminary survey spectrum (pass energy of 100 eV) for each sample, high resolution region spectra were obtained using a pass energy of 20 eV. Sputtering depth profiles were obtained using 500 eV monoatomic Ar+ ion bombardment at a low current density in 30 s intervals restored over an area of 4.5 mm by 4.5 mm. XPS characteristic spectra were obtained for each element after 20 min sputtering analysis and fitting with Gaussian-Lorenzian mixed function.

MFT Sample Characterization

Table 1 lists the weight percent of solid, moisture content, and bitumen in the raw MFT sample obtained by Dean-Stark extraction, following the same method reported in detail elsewhere[23]. The table also includes the major metallic compositions of the as received MFT sample, as measured by an inductively coupled plasma atomic emission spectroscopy (ICP-EOS), which was manufactured by Thermo Fisher Scientific iCAP 7200 with ASX560.

TABLE 1

Mass composition of the raw MFT sample.

| Methods | Compounds and ions | Unit | Value |
| --- | --- | --- | --- |
| Water Dean-Stark extraction | water | wt % | 53.10 |
|  | solids | wt % | 41.70 |
|  | bitumen | wt % | 5.20 |
| Elemental analysis (ICP-EOS) | sodium ($Na^+$) | ppm | 182.9 |
|  | potassium ($K^+$) | ppm | 43.1 |
|  | calcium ($Ca^{2+}$) | ppm | 22.4 |
|  | magnesium ($Mg^{2+}$) | ppm | 33.4 |

Settling and Dewatering Tests

Figure 2:
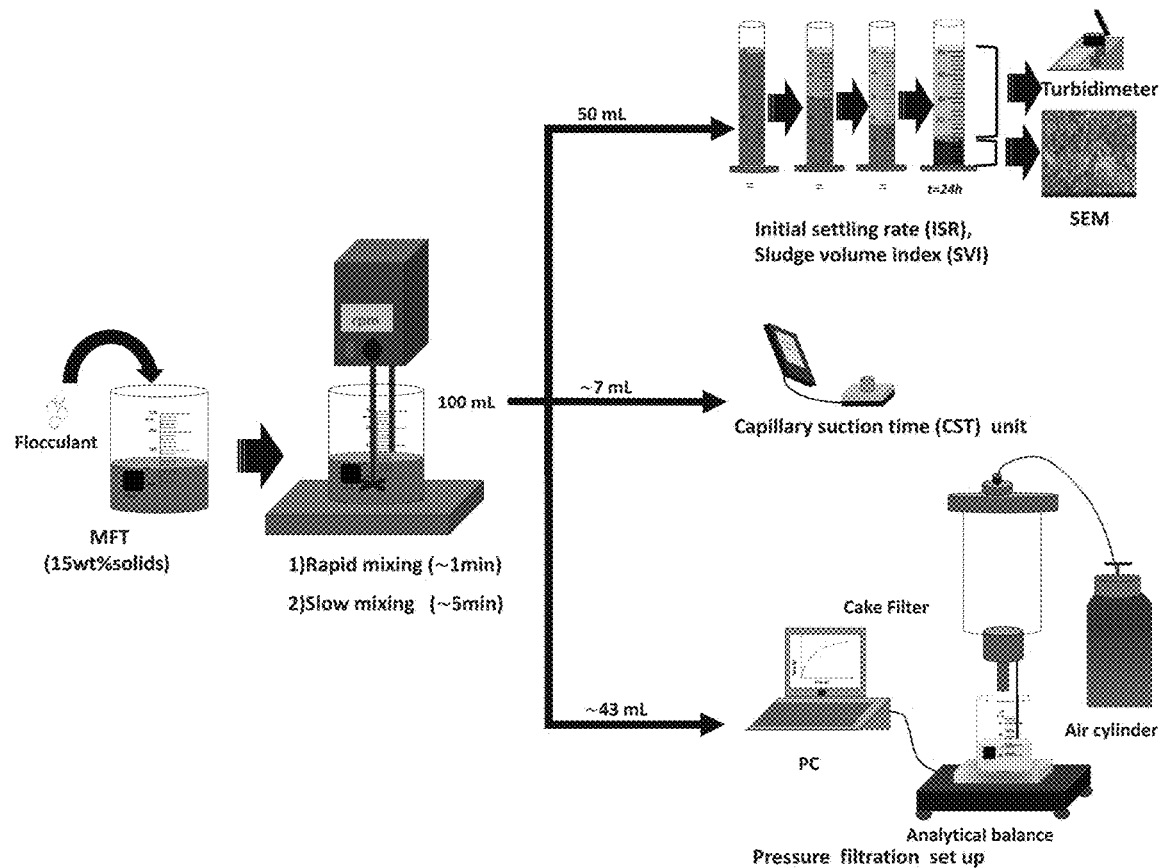
FIG. 2 Schematic representation of settling and dewatering tests for MFT sample.

Due to microstructural complexity and the high solid content of the raw MFT sample, the flocculation/sedimentation behavior cannot be simply investigated by the classical settling and dewaterability tests. In fact, dispersing the flocculant through a gel like-slurry cannot be possible without diluting the sample with a proper diluent. Thus, MFT suspensions at solid content of 15 wt % were prepared by diluting the raw MFT sample with an appropriate amount of deionized water. It is worth mentioning here that the original MFT sample is considered as a strong buffer solution and therefore, diluting it with deionized water, compared with other diluents, should not impact the water chemistry and colloidal stability during the flocculation process.[18] Accordingly, diluting our MFT sample should not impact the pH of the original suspension and using them to test the flocculation behavior of our nanoflocculants could be reproducible. To test the flocculation performance, Jar tests procedures were individually performed for our synthesized nanoflocculants to examine the settling and dewaterability of MFT slurry (diluted to 15 wt % solid). Firstly, 100 mL from the diluted MFT suspension was transferred to a 250 mL-beaker for mixing by a laboratory Cole-Parmer mixer with high-efficiency axial flow impeller (¾ in Diameter) into two stages: (1) stirring the diluted MFT suspension at 650 rpm for 1 min, followed by adding the desired flocculant under the same stirring speed with an additional 1 min (rapid mixing). Then, (2) the stirring of the same mixture was maintained at 200 rpm for 5 min (slow mixing). These mixing conditions contributed in attaining good contact between the flocculant and the MFT particles, increasing the formation of flocs, and avoiding their breaking down due to excessive shear. Thereafter, the mixing was stopped immediately, and the mixture was shaken and divided into three portions to assess flocculation performance of the each flocculant, which was done by measuring: (1) initial settling rate (ISR), (2) sludge volume index (SVI), (3) supernatant turbidity, (4) capillary suction time (CST), and (5) specific resistance to filtration (SRF), as detailed schematically on FIG. 2.

In order to estimate the ISR, around 50 mL from the slurry was transferred to a 50-mL graduated cylinder and changing of the level of the mudline (solid-liquid interface) over time was recorded and plotted during the initial settling period. Then, the slope of the plotted graph was calculated as ISR. During recording the settling of MFT particles, the goodness of settling sludge (subnatant) was evaluated for each flocculant by estimating the value of SVI, which was estimated by measuring the sludge volume in mL occupied by 1 g of sludge after 30 min of settling. Next, the slurry was allowed to consolidate for 24 h and the turbidity measurement was taken to the clear supernatant layer by a Hach TL2350 turbidity-meter. Later, the sediment after the settling experiment was recovered and lyophilized for 48 h together with the raw MFT sample. Then, the microstructure and morphology of the solids in both dried sediments were analyzed using a field emission Quanta 250 scanning electron microscopy analysis (SEM).

For dewaterability measurements, a small aliquot (~7 mL) from the mixed slurry was drained into a capillary suction time (CST) unit (Triton Electronics meter, Type 319 multi CST, Montreal, Canada). In the CST unit, the mixed slurry was poured over a Triton filter paper (7 cm×9 cm), where the water is allowed to release from the slurry mixture and the time taken for the released water to cross two designated point through the filter paper was measured as CST. The remaining suspension (~43 mL) was mixed following the previously mentioned procedure and poured inside pressure filtration apparatus to measure the SRF. The SRF apparatus had maximum capacity of 2 L and equipped with a 0.834 $cm^2$ stainless steel filter cloth that consists of square meshes with dimensions of 72×72 microns. The SRF measurements were taken by applying constant pressure (60 psi) over the poured mixture for 30 min that allowed for water to release from the slurry. The mass of the released water was recorded over time by an analytical balance connected to a computer. Then, the recorded data were plotted to calculate the SRF (m/kg) following Eqn (2):[18]

$$SRF = \frac{2\Delta PA^2}{C\mu_f}b \qquad (2)$$

where $\Delta P$ is the applied pressure in Pa; A is the area of the filter ($m^2$); C is the solid concentration in the slurry ($Kg/m^3$), $\mu_f$ is the dynamic viscosity of the filtrate (Pa·s), and b is the slope of the best-fit-line of t/V against V (where t is time in min and V is the volume of the filtrate in $m^3$), which has the unit of $s \cdot m^{-6}$. Worth noting here that settling and dewatering tests were performed three times for each sample, and the standard deviations were calculated and presented. Afterward, the obtained settling and dewaterability data were analyzed by RSM as described in the next section in order to select the optimal nanoflocculant. Then, the performance of the best nanoflocculant in flocculating the same MFT suspension was compared with commercially anionic polyacrylamide (PAM) at different dosages.

Statistical Analysis for Settling and Dewatering Tests

Response surface methodology (SRM) was applied to determine the best conditions for grafting of the synthesized nanoflocculants. A complete factorial design was used to determine the effects of two independent variables: the grafted amounts of monomer AC ($X_1$) and surfactant SLS ($X_2$) on settling and consolidation performance of as prepared nanoflocculants.[33] Accordingly, diverse nanoflocculants were prepared by varying the amounts of monomer (6-18 g AC) and surfactant (1.6-3.6 g SLS) as presented in Table 2. The table lists the investigated independent variables ($X_1$ and $X_2$) at three experimental levels, in which coded levels are the normalized levels of "−1, 0, and +1" stand for the low, medium, and high levels of independent factors, respectively. The output variables (responses) that result from the flocculation-consolidation tests (i.e., ISR, SVI, turbidity, CST, and SRF), were analyzed following RMS by a second-order polynomial surface mathematical model that adequately represents the relationship between the grafting conditions ($X_1$ and $X_2$) and the responses (Y) as follow:[33]

$$Y_u = b_o + \Sigma b_i x_{iu} + \Sigma b_{ii} x_{iu}^2 + \Sigma b_{ij} x_{iu} x_{ju} \qquad (3)$$

Where $Y_u$ is the corresponding response; $x_{iu}$ is the coded value of the synthesis i-th parameters for u-th experiments; $b_i$, $b_{ii}$, and $b_{ij}$ are the second-order regression coefficients. The second and third terms with summation from Eqn 2 are the linear and quadratic effects, while the last term with summation corresponds to the interactive effects of the process parameters. Following the SRM, the model regression coefficients along with their significance can be obtained by the analysis of variance (ANOVA), which was statistically done by utilizing Minitab V19. The software allowed us to check the accuracy and significance of the predicted model through testing the significance of model coefficients and lack of fit tests (LOF). With the use of OriginLab2021, three-dimensional surface response and contour plots were generated and plotted for observing the response variables at the optimal conditions.

TABLE 2

Experimental design matrix.

| Factors | Units | Low (−) | Medium (0) | High (+1) |
|---|---|---|---|---|
| $X_1$ | g | 6 | 11 | 18 |
| $X_2$ | g | 1.6 | 2.6 | 3.6 |

Results

Characterization Studies

Figure 3:
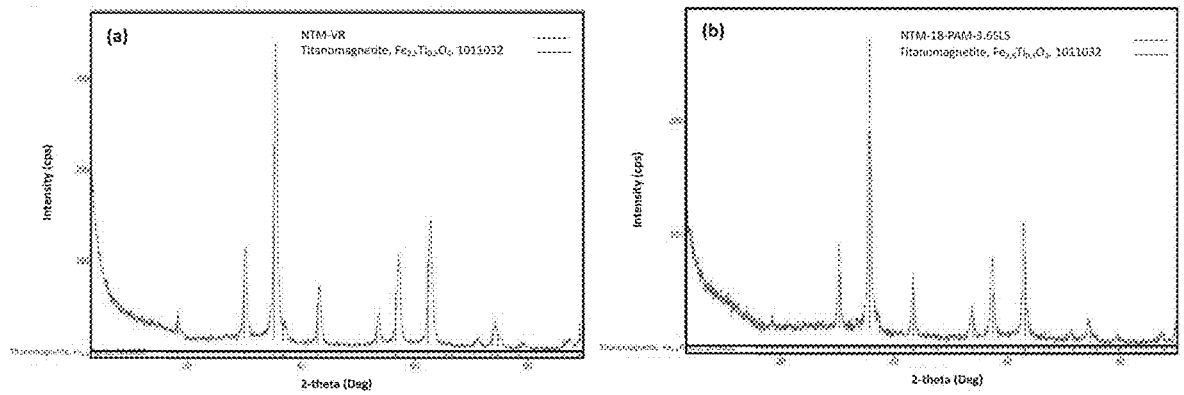
FIG. 3 X-ray diffraction powder patterns in the region of 10-90° for the synthesized NTM (a) before (NTM-VR) and (b) after grafting with PAM/SLS (NTM-18PAM-3.6SLS).

FIG. 3 shows the XRD patterns of the synthesized NTM nanoparticles before (FIG. 3a) and after grafting with PAM/SLS (FIG. 3b). For both materials, the obtained patterns confirmed generation of the titano-magnetite (Fe~$_{2.5}$Ti~$_{0.5}$O$_4$), where the position and relative intensity of all observed diffraction peaks are matched well with those of the powder diffraction file (PDF) card #1011032 for titanomagnetite in the JADE V.7.5.1 program, using the Database of Materials Data XRD Pattern Processing Identification and Quantification.[35] As seen, the peaks are broad indicating that the prepared materials have indeed very small crystalline domain sizes, ranging from 20 to 30 nm, as estimated by the Scherrer equation.[36] It is also shown that broadening of the characteristic peaks for the grafted nanoparticles with PAM/SLS were almost the same as those of the virgin nanoparticles, suggesting that the grafting steps did not alter the crystalline structure of NTM nanoparticles. These results also suggest that grafting the NTM nanoparticles with PAM/SLS did not impact its crystalline structural geometry nor size. However, the intensities of the peaks upon grafting are slightly lower than that of virgin nanoparticles, which is related to the existence of the polymer chains of PAM/SLS on the surface of NTM.

Figure 4:
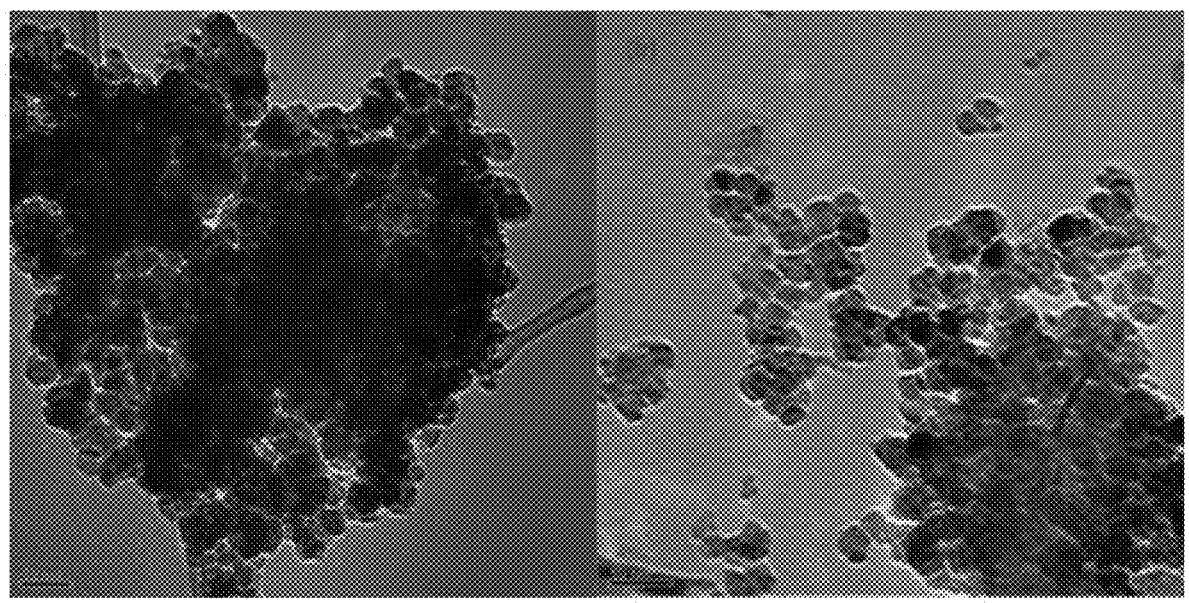
FIG. 4 HRTEM images for the nanoparticles of NTM (a) before and (b) after grafting with PAM/SLS (NTM-18PAM-3.6SLS) (line mark in the image corresponds to 50 nm).
Figure 5:
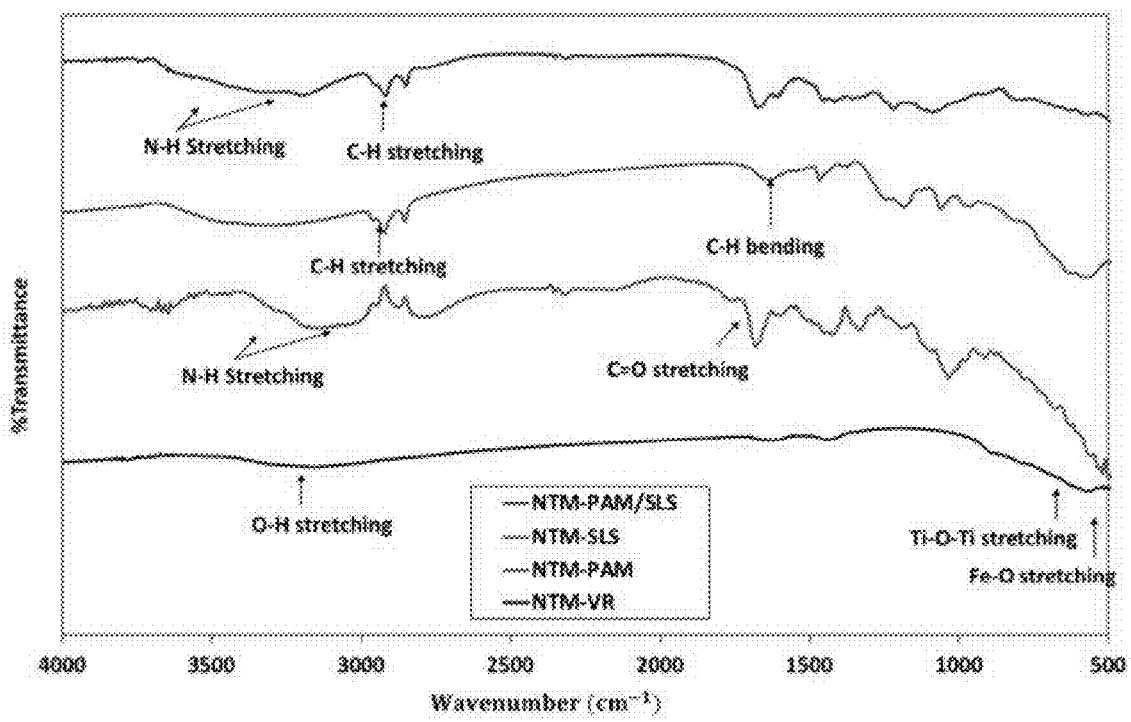
FIG. 5 FTIR spectroscopy for NTM, NTM-PAM, NTM-SLS and NTM-PAM/SLS at framework region of 4000-500 cm-1.

These results were visually confirmed by the HRTEM analysis as shown in FIG. 4. The figure shows selected HRTEM images obtained for the NTM before (FIG. 4a), and after grafting with PAM/SLS (FIG. 4b). As shown from both images, the nanoparticles have size ranges from 20-30 nm, verifying that grafting the nanoparticles did not influence their morphological structure, as confirmed by the X-ray findings. Besides, it can be clearly seen that the particles, due to their stability after coating their surfaces with polymer/surfactant matrix, are greatly dispersed.

To further study the framework infrared region of the NTM nanoparticles and identify the molecular bonds and functional groups after their surface modifications, the FTIR analysis was carried out for the neat nanoparticles of NTM-VR before and after grafting with PAM (NTM-18PAM), SLS (NTM-3.6SLS), and PAM/SLS (NTM-18PAM-3.6SLS) as presented in FIG. 4. Before grafting, the structure of titanomagnetite nanoparticles portray clear bands pertaining to stretching vibration bands for each of Fe—O and Ti—O—Ti shown at regions around 584 and 810 cm$^{-1}$, respectively.[37] The neat NTM also shows a stretching hydroxyl band around 3300 cm-1 that is observed due to the hydrothermal preparation of the nanoparticle of NTM.

After grafting, strong absorption at 3414 and 1659 cm$^{-1}$ can be attributed to the carbonyl group stretching in the —CONH$_2$ group, indicating the successful formation of stable PAM on the surface of the nanoparticles under the synthesis reaction conditions.[44][45] These results confirmed that the PAM molecules were successfully anchored to the surface of the NTM. For NTM-SLS sample, stretching and bending bands of C—H were achieved at regions of 2850 and 1650 cm$^{-1}$, respectively, indicating successful adsorption of SLS molecules on the surface of metal oxide nanoparticles via lipophilic feature as explained earlier. However, it is noticed that there is a significant shift and frequency change on the absorption peaks of N—H for NTM-PAM/SLS that obtained at 1610 and 3400 cm$^{-1}$, which implies to the interaction of SLS on the N—H groups of PAM backbone. Additionally, more absorption bands for NTM-PAM/SLS were obtained at regions of 1500 and 2850 cm$^{-1}$ that attribute to presence of C—H stretching and bending, respectively, suggesting the binding of SLS with grafted PAM on NTM nanoparticle surface. These results were also confirmed by the XPS analysis that was performed for the same samples (NTM, NTM-PAM, NTM-SLS, and NTM-PAM-SLS). These figures represent XPS characterization peak surveys along with fitting the obtained spectra to the components that correspond to various grafting materials. For NTM, it can be noticed that the binding energies centered at 1100, 724, 458, 521, 399, and 188 eV are assigned to the spectra of Na1s, Fe2p, O1s, Ti2p, N1s, and S2p, respectively. Accordingly, NTM surface is mainly composed of Fe, Ti, and O that exist in atomic percentages of 30.9, 3.2, and 50.5% (Fe~$_{2.5}$Ti~$_{0.5}$O$_4$). After grafting with PAM, it was observed that the XPS characterization peaks for each of Fe2p and Ti2p were disappeared due to covering the surface with the polymerized material at depth exceeding the XPS surface penetration limit (7-10 nm). However, other high intensity XPS characterization peaks related to the polymeric structure, arose at binding energies of 531, 399.78, and 288 eV, which are assigned for O1s, N1s, and C1s. With grafting the nanoparticles by the SLS molecules, the surface of NTM was partially covered with the surfactant molecules, resulting XPS characteristic peaks of Na1s, Fe2p, O1s, Ti2p, N1s, C1s, and S2p, which were assigned at binding energies of 1100, 724, 521, 458, 399, 284, and 169 eV, respectively. In the case of NTM-SLS, compared with just the NTM, high intensity S characteristic peak was obtained around 169 eV, which is typically asymmetric because of unresolved peaks, confirming that SLS was successfully bounded to nanoparticle surface. With dual functionality nanoparticles (NTM-PAM/SLS), full-coverage of NTM was also obtained with polymer and surfactant due to absence of XPS characteristic peaks for Ti and Fe. However, other high intensity characteristic peaks were assigned for Na1s, O1s, N1s, C1s, and S2p at binding energies of 1071, 531, 102, 248, and 285 eV, respectively, verifying the grafting of NTM with PAM and SLS. According to some previous studies, three scenarios can be suggested to represent grafting the NTM with PAM and/or SLS (FIG. 1). In the first scenario, SLS molecules and PAM chains are separately bounded to the nanoparticle surface. While in the second scenario, it is assumed that the surfactant molecules are adsorbed on the polymeric chain via simple electrostatic interaction or in the form of polymer-aggregate complexes.[32] In the third case, there may be complex formation between the polymer chain and surfactant micelles or between polymer chains and premicellar aggregates.[32] Other associations may result in the formation of so-called hemi-micelles along the polymer chain.[32] Hence, the primary driving force for polymer-surfactant interaction in such a system might be attained either by Van der Waals forces or the hydrophobic effect.[32] Wang et al. (2012),[46] have theoretically confirmed that the aggregates formation process of PAM and SLS can be divided into three stages: first, PAM curls rapidly until radius of gyration (Rg) of PAM reaches its minimum, and few SLS molecules are adsorbed on polymer backbone; then, more SLS molecules are adsorbed onto the polymer backbone, which makes the polymer stretch and the Rg of PAM increase slowly; finally, a commonly accepted "beaded necklace" structure is formed with PAM located at the interface of the hydrocarbon region and the hydrophilic region of an SLS micelle.[46] These results observed that hydrophobic interaction is the driving force for the association of PAM and SLS molecules. In our present study, we also concluded that first and second scenarios might be coexisted forming third grafting scenario, as clearly shown in FIG. 1.

Figure 6:
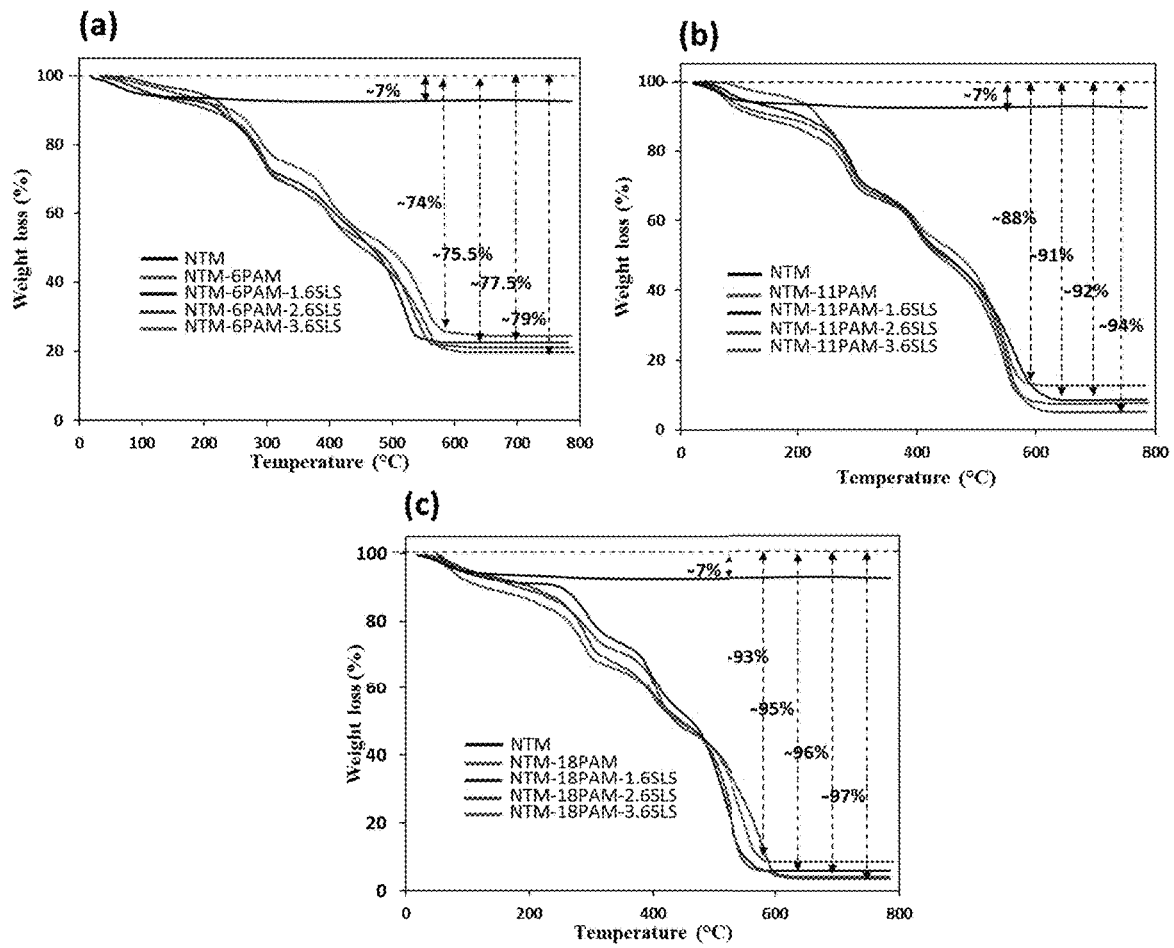
FIG. 6 TGA thermograms of NTM nanoparticles before and after grafting with different concentrations of AC and SLS during the synthesis.

To get more insight into the loading mass percentages of grafted PAM/SLS on the nanoparticles, TGA analysis were carried out for the non-grafted NTM (NTM-VR) and grafted NTM with various amounts of PAM and SLS as shown on FIG. 6. The figure presents the thermograms for the NTM nanoparticles grafted with different loadings of PAM/SLS. The TGA curves were divided into two regimes: a) 25 to 200° C., related to the released of gases and physically adsorbed water molecules;[39] b) 200 to 600° C., linked to the thermo-oxidative decomposition of the grafted species on the surface of NTM nanoparticles.

The mass loss of each grafted nanoparticles, in regime b, was used to estimate the amount of grafted PAM and/or SLS. As seen, the total mass loss increases with PAM loadings. Varying the concentration of the monomer during the synthesis reaction from 6 to 18 g led to mass loss percentages from 74 and 93 wt %, respectively. These percentages are very close to the actual mass percentages, within experimental errors, of the AC monomer used for polymerization reaction. This suggests that the average molecular weights of the grafted nanoparticles increase significantly with the increasing monomer dosage used in terminating the polymerization reaction. The absence of unbounded species of AC monomers, and the increase of PAM molecular weight with increasing the concentration of AC during the synthesis, suggests that the polymerization reaction propagated through head to tail polyaddition mechanism with absence of polycondensation or disproportionation of the radical chains that might lead to nihilate the free radical polymerisation activities or causing ineffective grating of PAM.[40] In fact, the presence of an acidic media for polymerization process of AC monomers, which protonates O or N protonated of AC, helps to eliminate the polycondensation reactions which might lead to formation of PAM chains with low molecular weight.

On the other hand, the addition of SLS as a secondary coating step, is clearly evident with the further increase of mass loss percentages (i.e. 1-6 wt %) upon the addition of SLS during the preparations of PAM/SLS grafted NTM nanoparticles. It is worth mentioning here that the concentrations of SLS grafted on the nanoparticles in all the cases were lower than the CMC of the surfactant (0.0024 g/mL). This is in accordance with the testing results of the FTIR discussed before, and hence, supports the evidence for the PAM/SLS grafting on NTM nanoparticles.

Flocculation Consolidation Performance of the Prepared Nanoflocculants

Table 2 shows the experimental flocculation and consolidation results (ISR, SVI, turbidity, CST, and SRF) obtained following the run sequence performed in our investigation based on RSM. By the RSM, our statistical analysis allowed us to find out the effects of each independent variable (i.e., amounts of grafted monomer ($X_1$) and surfactant ($X_2$)), interaction and quadratic effects by correlating them with the response values (Y) in form of multiple linear regression model that was presented in Eqn 3. Employment of the linear regression by the MinitabV19 provided us the coefficient parameters for the constant, linear, interaction, and quadratic terms along with their validation and adequacy at the 95% of confidence level through analysis of variance (ANOVA). ANOVA results for the responses of ISR, SVI, turbidity, CST, and SRF are presented in Tables S1, 2, 3, 4, and 5, respectively. Each ANOVA table lists the values of degrees of freedom (DF), adjusted sum squares (AdjSS), adjusted mean squares (AdjMS), F-statistics, and P-values for the model, linearity, independent variables ($X_1$ and $X_2$), square, 2-ways interaction, and error. Based on the ANOVA analysis, the null hypothesis analog can be used to determine the effect of each term resulted from the linear regression of our data with Eqn 3. The null hypothesis assumes absence of any linear relationship between the independent variables ($X_1$, $X_2$, $X_1^2$, $X_2^2$, and $X_1 X_2$) and each response (1), such that the model coefficients are equal zero ($H_o$: $B_1 = B_2 = B_3 = \ldots = B_P = 0$)[33]. This null hypothesis can be accepted or rejected by conducting F-tests for every term in the model equation. In the F-tests, the statistical values of F (F-statistic), presented in the ANOVA tables, are compared with the standard values of F (F-standard) at the tabulated degrees of freedom. The larger the magnitude of F-statics and correspondingly the smaller the F-standard, the more significant are the corresponding models and the individual coefficients. Also, the effects of each term can be statistically significant if the associated P-values are less than 0.05 (i.e., $\alpha = 0.05$ or 95% confidence intervals). 33 To further examine the adequacy of the model according to the linear regression assumptions, the residual plots, and Pareto table chart for the standardized effects obtained for each response are also included in FIGS. S1-4. After performing ANOVA for every response model, the insignificant predictors can be dropped out, resulting a model based on significant predictors only. This will result in different response models obtained at different combinations for mass of monomers and surfactants. These models, with the use of OriginLab2021, can demonstrate each response individually at the optimal levels by computing 3D surface and 2D contour plots, as explained below in details.

TABLE 3

Experimental results obtained though the flocculation and
consolidation tests (ISR, SVI, turbidity, CST, and SRF).

Initial Settling Rate (ISR)

| Run | Grafting conditions (coded levels) | | Responses | | | | | |
|---|---|---|---|---|---|---|---|---|
| | Monomer amount (g) | Surfactant amount (g) | ISR cm/s | SVI ml/g | Turbidity NTU | CST (s) | b (s/m$^{-6}$) | SRF (m/Kg) |
| 1 | 6 (−1) | 1.6 (−1) | 0.9 | 3.5 | 379 | 117 | 47.2 × 10$^{11}$ | 3.9 × 10$^{11}$ |
| 2 | 6 (−1) | 2.6 (0) | 1.3 | 2.9 | 363 | 109 | 46.0 × 10$^{11}$ | 3.8 × 10$^{11}$ |
| 3 | 6 (−1) | 3.6 (+1) | 1.8 | 2.7 | 298 | 72 | 32.4 × 10$^{11}$ | 2.7 × 10$^{11}$ |
| 4 | 11 (0) | 1.6 (−1) | 3.8 | 2.8 | 243 | 71 | 31.0 × 10$^{11}$ | 2.6 × 10$^{11}$ |
| 5 | 11 (0) | 2.6 (0) | 4.8 | 2.1 | 182 | 63 | 24.4 × 10$^{11}$ | 2.0 × 10$^{11}$ |
| 6 | 11 (0) | 3.6 (+1) | 6.4 | 1.9 | 143 | 42 | 18.1 × 10$^{11}$ | 1.5 × 10$^{11}$ |
| 7 | 18 (+1) | 1.6 (−1) | 5.0 | 1.7 | 134 | 44 | 17.3 × 10$^{11}$ | 1.4 × 10$^{11}$ |
| 8 | 18 (+1) | 2.6 (0) | 6.6 | 1.5 | 61 | 22 | 9.8 × 10$^{11}$ | 8.2 × 10$^{10}$ |
| 9 | 18 (+1) | 3.6 (+1) | 7.0 | 1.2 | 42 | 23 | 2.9 × 10$^{11}$ | 2.5 × 10$^{10}$ |

ISR results obtained y flocculating the MFT suspension (15 wt % solid) with applying our diverse nanoflocculants are displayed in Table 3. While the statistical analysis of ISR results is shown in Table S1 (ANOVA table), FIG. S1 (Pareto chart for the standardized effects at α=0.05) and FIG. S2 (Residual plots). According to the ANOVA analysis, the effects of $X_1$, $X_2$, and quadratic predictors are significant. While the effect of 2-way interaction is insignificant. Thus, the insignificant terms (terms with P-values>0.0.05) can be discarded from Eqn 3 (response surface equation) and the resulting model can be only expressed in terms of significant predictors. These results are also confirmed by the Pareto chart, which shows the large standardized effects in standard deviation unites for the same significant predictors ($X_1$, $X_2$, and $X_1^2$). The residual plots (FIG. S2 a-d) include the normal probability plot (FIG. S2a), residual verses fitted graph (FIG. S2 b), residual versus frequency (FIG. S2 c), and residual versus observation order (FIG. S2 d). The normal probability plot shows that the data followed the straight line, verifying the normal distribution of the obtained results and no evidence of non-normality, skewness, outliers or nondeified variables. FIG. S2b explains the consistency of the variance in errors, whereas FIGS. S2 c and d clearly identifies that the effect of observation order in inducing the results, when the data are collected in a different time sequence. Both figures confirm that the residuals are randomly scattered about zero, thus signified that residuals have constant variance in error terms and data were not affected by the observation order. Absence of certain trend in the residual plots proves that the assumptions of the regression model are satisfactorily met. Hence, the final regression surface equation in corded unites for the ISR after discarding the insignificant terms can be presented as:

$$ISR \text{ (cm/s)} = -7.83 + 1.42X_1 + 0.88X_2 - 0.04X_1^2 \quad (4)$$

Figure 7:
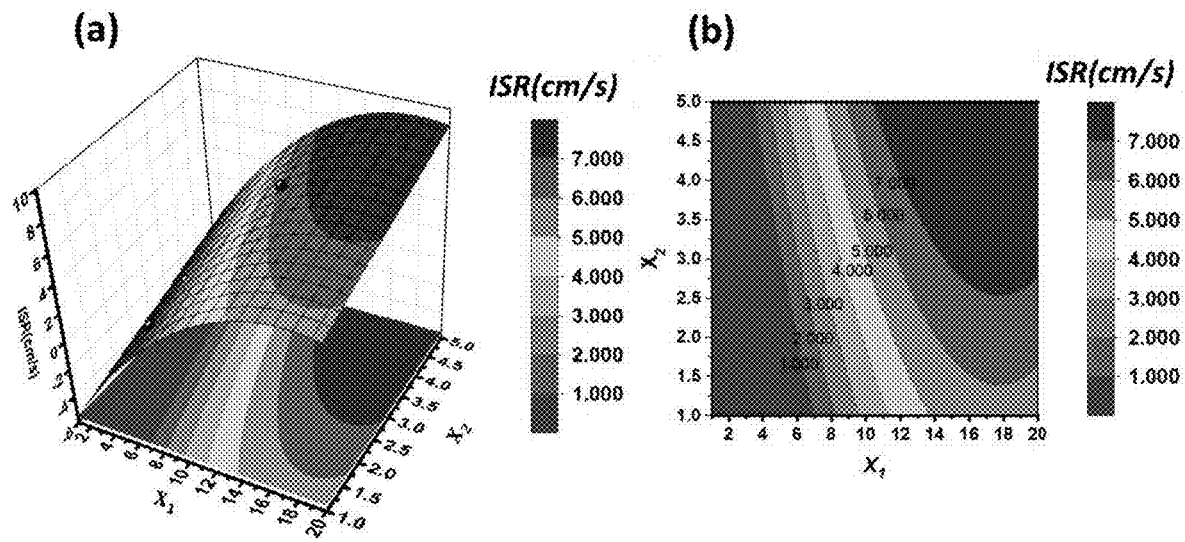
FIG. 7 (a) Surface response and (b) contour plots of ISR obtained under influence of applying various nanoflocculants generated from using various amounts of monomer (X1) and surfactant (X2) grafted on NTM nanoparticles.

Eqn (4) was used to illustrate the most significant predictors on the ISR by three-dimensional surface response (FIG. 7a) and contours plots (FIG. 7b). Both figures imply that both $X_1$ and $X_2$ factors had high impact on the settling rate of the generated nanoflocculants, such that faster range of ISR can be achieved with applying nanoflocculants grafted with greater amounts of PAM and SLS. Our nanoflocculants, due to presence of sufficient hydrophobic side chains (i.e., SLS) bonded to the backbone of the PAM, were able to create bridging force that contributed in capturing large number of solid particles presented in MFT solution, then allowing them to settle down rapidly.[32] The role of the hydrophobic side chains grafted on PAM in enhancing the settling rate of the MFT has been proven by a previous study that showed obtaining fast ISR (~0.36 cm/s) by simultaneous addition of equal mass fractions of PAM and SLS at dosage of 0.75 mg/g for flocculation of 15 wt % kaolin suspensions.[32] However, the ISR value, with applying greater dosages from the PAM/SLS mixture, did not exceed 0.4 cm/s.[32] In fact, the PAM chain, after exceeding certain limit, tends to be partially or completely neutralized in presence of counter-ions (negatively charged lauryl sulfate anions), which reduces the flocculation efficiency that is attained by the charge neutralization mechanism.[32] Alternatively, our nanoflocculants contain hydrophobically modified segments that enhanced the speed of settling and consolidation of the stable sand particles through both bridging and surface neutralization mechanism. Grafting of greater numbers from the hydrophobically modified segments on the core structure of our nanoflocculants led to enhancing the number of the "bridging sites". These bridging sites on our nanoflocculants were able to flocculate more stable MFT particles in larger surface area and less volume, leading to lower the applied dosages. Our obtained ISRs, compared with many cationic copolymers recently used to flocculate the negatively charged MFT particles via charge neutralization mechanism, were higher.[17,18,20] For instance, slower ISRs were achieved by flocculating MFT suspension that contained 5 wt % solid with cationic polycaprolactone choline iodide ester methacrylate (PCL$_2$ChMA)-based copolymers after degradation of the polyester side chains at dosage of 5000 ppm was between 0.2-0.4 m/h (0.005-0.01 cm/s).[21] In a recent study, the temperature responsive cationic polymeric flocculent of N-isopropylacrylamide (NI-PAm) and 2-aminoethyl methacrylamide hydrochloride (AEMA) copolymers resulted in ISR values of 15 wt % MFT between 0.02-5 m/h (0.0005-0.13 cm/s) by changing the dosage between 500-1000 ppm and the MFT temperature between 25-50° C.[19] In more recent work, flocculation of 5 wt % MFT by applying different average molecular weights and copolymer compositions of poly(acrylamide-co-diallyldimethylammonium chloride) (AC/DADMAC) resulted in lower range of ISR values (0.001-0.04 cm/s).[18]

Sludge Volume Index (SVI)

In analysis of SVI results (Table 2) through varying the levels of $X_1$ and $X_2$ predictors we modeled the SVI versus our predictors to examine the significant levels of each term in Eqn 3. ANOVA results (Table S2) reflected that both $X_1$ and $X_2$ predictors had significant effect on the SVI, with absence of any interaction effects. Pareto chart (Figure S3), and residual plots (FIG. S4 a-d) confirmed that broadness of the standardized effects for the significant predictors and following the assumptions of the linear multiple regression model presented in Eqn 3. Accordingly, the model equation in coded variable after excluding the insignificant terms can be mathematically shown as:

$$SVI\ (mL/g) = 616.2 - 23.51 X_1 - 109.80 X_2 + 0.307 X_1^2 \qquad (5)$$

FIGS. 7a and b, respectively, exhibits a three-dimensional surface response and contour plots for the significant predictors presented in the Eqn (5). Both figures showed that both $X_1$ and $X_2$ are dominant factors for sludge generated by testing our synthesized nanoflocculants. This confirms that enhancing the amount of grafted polymer/surfactant on the nanoflocculants decreased the specific volume of the generated sludges (SVI).[41] Unfortunately, none of the previous attempts which reported enhancing the settling and densification of MFT by various flocculants considered the SVI as a response for their investigations.[17,19,29-31] In fact, SVI is a primary indicator about the readiness levels of the sludges to be settled down and thickened. In coagulation-flocculation processes, the good quality sludges are those which can be readily settled or densified at values of SVI<200 mL/g, while the sludges that have values of SVI>200 mL/g are classified as bulking sludge that cannot be settled easily.[42] In our present study, it can be noticed that SVI values tend to be much lower than 100 mL/g, and with grafting more from the hydrophobically modified chains of PAM/SLS mixture, the SVI values were further reduced. Presence of the nanoparticles in the core structure of our nanoflocculants allowed to add more segments of the polymeric chains that can destabilize more solid particles from MFT and bridging them to be rapidly precipitated and separated.

Turbidity of Supernatant

The clarity of the water recovered after settling the MFT for 24 h was measured by the turbidity measurements and the results are shown in Table 3. The predictors of $X_1$ and $X_2$ were statistically correlated with the obtained turbidity measurements by analyzing them with the RSM. The analysis of data by RSM allowed the development of response surface equation where the turbidity, as response, was assessed as a function of the independent variables of $X_1$ and $X_2$ and calculated as the sum of constant, two linear, two quadratic, and one interaction effects according to Eqn 3. The resulting response surface equation can be represented in coded unites as:

$$Turbidity\ (NTU) = 756 - 52.70 X_1 - 64.30 X_2 + 1.30 X_1^2 \qquad (6)$$

Figure 8:
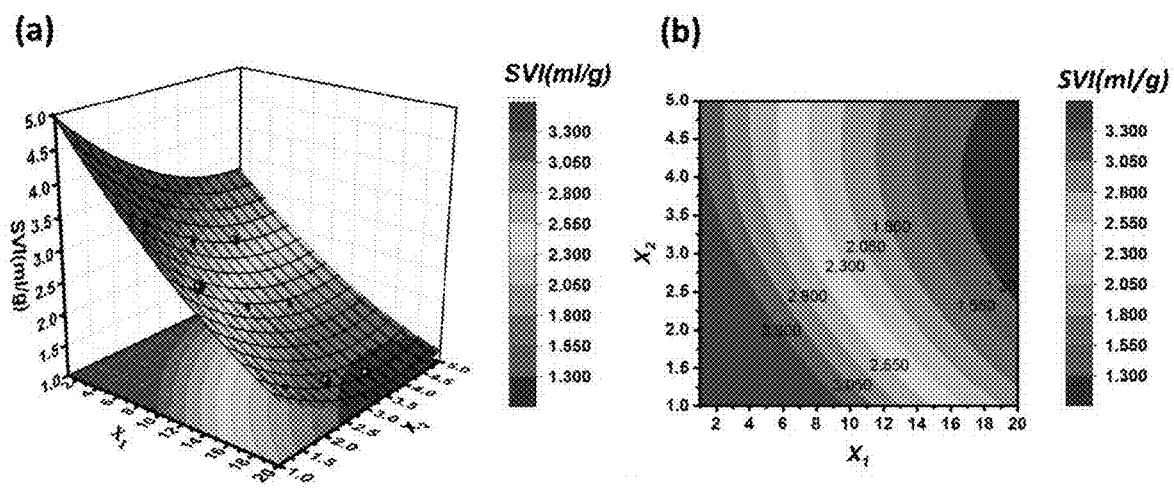
FIG. 8 (a) Surface response and (b) contour plots of SVI obtained under influence of applying various nanoflocculants generated from using various amounts of monomer (X1) and surfactant (X2) grafted on NTM nanoparticles.

The ANOVA table (Table S3) indicates that the equation terms of $X_1$, $X_2$, and $X_1^2$ are significantly affecting the turbidity of the supernatant (low P-values). However, insignificant effects are noticed for the terms of $X_2^2$, and $X_1 X_2$. These results are confirmed by FIG. S5 that clearly shows the standardized effects for the significant predictors. The residual plots, given in FIG. S6 a-d, confirms that the relationship between the predictors is adequately described by the linear multiple regression model. FIGS. 8a,b illustrate the three-dimensional response surface graphs and two-dimensional contour plots of the quadratic model. The response surface plot (FIG. 8a) confirms that with applying the nanoflocculants that contained greater amounts of grafted polymer and surfactant generated supernatant layers with lower turbidity. On the other hand, the contour curve (FIG. 8b) has a very low considerable curvature, implying that the interactions between each two factors were insignificant. Our nanoflocculants allowed for better MFT flocculation behavior due to presence of great number from the hydrophobically modified PAM chains with SLS on the nanoflocculant surface. These chains contributed to trapping higher amounts from the solid particles presented in the MFT, which allowed to lower the supernatant turbidity. Our findings strongly agreed with many previous studies that showed dropping in the supernatant turbidity of the flocculated MFT with applying hydrophobically modified copolymers.[17,19,29-31] It has been reported that flocculation of the fine MFT particles with applying hydrophobically modified copolymers was effective in overcoming the electrostatic repulsion and creating high affinity bridges between the stabilized clay particles.[17,19,29-31] Nevertheless, these cationic copolymers, after exceeding certain dosages, did not show low degrees of residual turbidity removal of the solids presented in MFT.[17,19,29-31] In fact, increasing the dosages of these flocculant beyond certain limit allowed for re-stabilizing the negatively charged clay particles with positive charges, which subsequently enhanced the residual turbidity to a higher value. This emphasizes that adsorption and charge neutralization were the dominant mechanism involved in flocculating the solid particles presented in the MFT.[42] However, the flocculation performance obtained with our nanoflocculant provided better removal of the solid particles with increasing the grafted segments of PAM/SLS on the NTM nanoparticles. Hence, presence of NTM nanoparticles in the core structure of the nanoflocculant, allowed to the remove the solid particles in MFT predominantly by bridging mechanism.

Capillary Suction Time (CST)

According to Eqn (31, the CST measurements were modeled following the RSM to predict the influence of $X_1$ and $X_2$ by giving an insight into the linear, quadratic, and interaction effects. From ANOVA (Table S4), it can be concluded that the individual regression coefficients of the linear and quadratic terms had significant effects on the response, while both the quadratic and interaction of the two factors are insignificant in the CST value. In other words, only the linear effects of the predictors were the major determining conditions that might cause considerable effects on the CST measurements. The interaction between them, on contrary, were not much present in the experimental domain. The Pareto chart (FIG. S7) and residual plots (FIGS. S 8a-d) showed that model, with considering the significant factor, greatly captured the assumption of linear regression model.

Thus, the model that describes the effect of the significant predictors in coded variable with respect to the CST takes the form:

$$CST(\text{Second}) = 221.50 - 16.31X_1 - 10.70X_2 - 10.70X_1^2 \quad (7)$$

Figure 9:
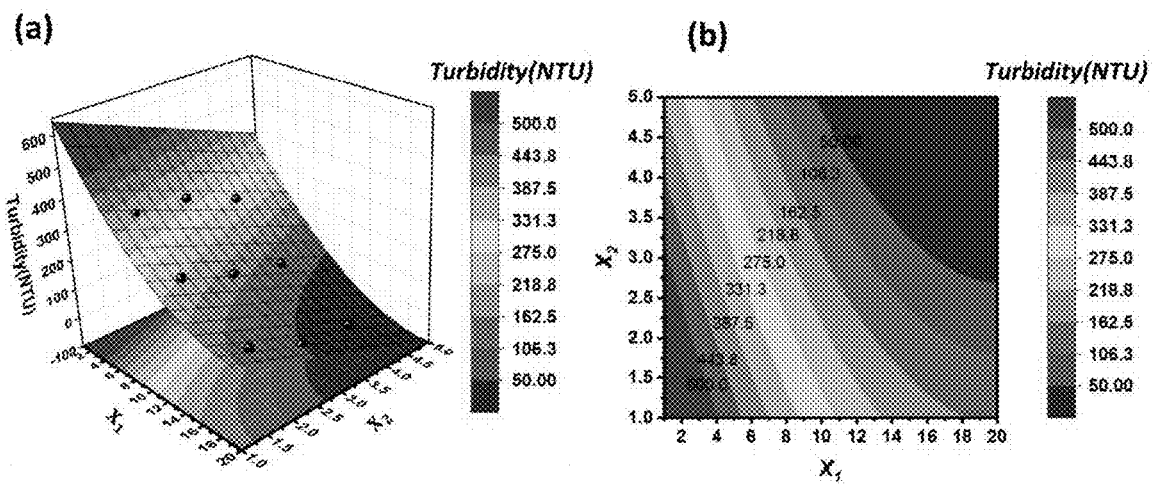
FIG. 9 (a) Surface response and (b) contour plots of turbidity of supernatant obtained under influence of applying various nanoflocculants generated from using various amounts of monomer (X1) and surfactant (X2) grafted on NTM nanoparticles.

FIGS. 9a,b illustrate the 3D response surface plots and 2D contour plots of the response surface equation that present the obtained CST measurements by changing the grafted amounts of PAM ($X_1$) and surfactant ($X_2$). As shown in FIG. 9a, the CST values are inversely proportional to the grafted amount of PAM and surfactant on the prepared nanoflocculants. Thus, the nanoflocculants with high content of PAM/SLS produced sediments with lower values of CST (good candidates for mechanical dewatering). In fact, absence of hydrophobic interactions between the polymeric chains and the solid particles presented in the MFT produces sediments with higher moisture content.[17,19,29-31] For instance, the MFT sediments resulted from using PCL$_2$ChMA-based polymers, as flocculant, were easier to dewater (up to an 85% reduction in CST) after degradation of the polyester side chains (hydrophilic chains).[21] Similar dewatering performance has been obtained for many PAM-based polymeric flocculants copolymerized with different hydrophobic grafts on the PAM backbone.[17,19,29-31] For instance, the sediments generated from flocculation of the MFT (2-5 wt % solid) by acrylamide (AC) copolymerized with propylene oxide (PPO) or diallyldimethylammonium chloride (DAMAC) resulted in low levels of CST (<50 s).[17,18] Even so, these studies have shown that grafting low molecular weights of PPO or DAMAC to the backbone of PAM performed better in dewatering the MFT suspension than those with longer grafts.[17,18] Such consolidation behavior has been obtained since the charge density was the limiting factor in determining the dewaterability performance of the generated flocs, such that increasing the fraction of hydrophobic grafts led to reducing the charge density of the copolymers that led to enhance the flocculation performance via charge neutralization mechanism. Our nanoflocculants with longer hydrophobic grafts, as oppose to these cationic copolymers, provided lower CST, which was dominated by bridging mechanism.

Specific Resistance to Filtration (SRF)

Figure 10:
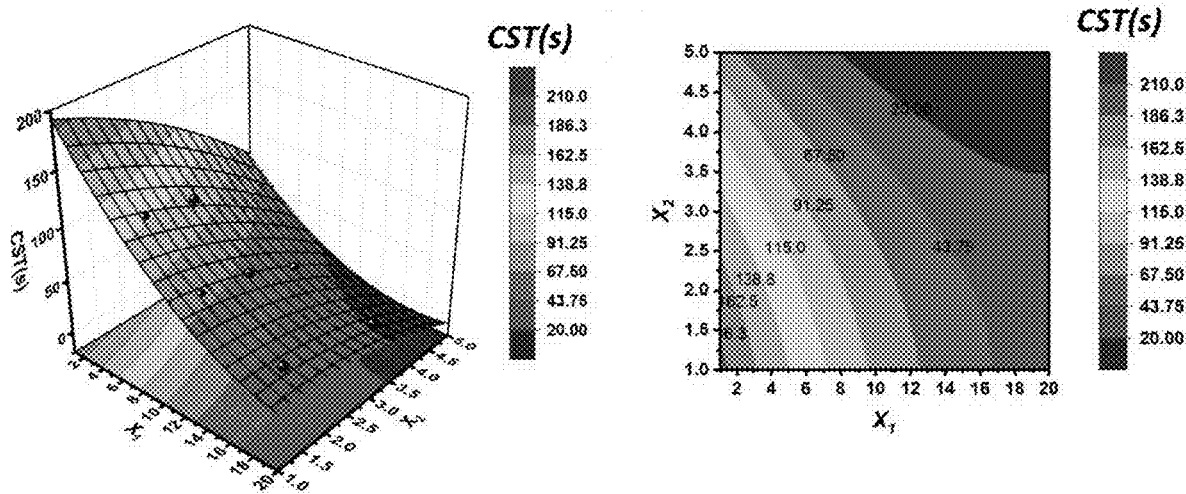
FIG. 10 (a) Surface response and (b) contour plots of CST obtained under influence of applying various nanoflocculants generated from using various amounts of monomer (X1) and surfactant (X2) grafted on NTM nanoparticles.

As an indicator for the dewaterability performance, the CST data cannot be reliable in many applications since the CST results are not very accurate, especially with long experiments and heavy sludges.[43] Alternatively, the resistance of the consolidated MFT slurries toward pressure filtration as SRF can be used as more practical indicator for the dewaterability of the sediments. The values of SRF (m/kg) for the sediments generated from flocculation of 15 wt % MFT with our synthesised nanoflocculants, which are listed in Table 3, were calculated using the values of b (the slope of linearized relationship between V (m$^3$) against (t/V) (s/m$^3$)), as described earlier (see FIG. 10). The ANOVA table along with residual plots and a Pareto chart for the standardized effects of significant predictors are includes in Table S5, FIG. S10, and FIGS. S11a-d, respectively. ANOVA table for the regression coefficients presented in Eqn 3 shows significant effects of that the linear and quadratic terms, in contrast to the interaction terms that had insignificant effects, following the same correlation obtained by the CST. The standardized effects for the significant predictors are also shown in the Pareto charts. While the residual plots confirm that the residuals are randomly scattered and the estimated data were not affected by the observation order, confirming that the assumptions of the regression model were reasonably met. Thus, the resulting model equation with coded variables after discarding the insignificant predictors can be presented as:

$$SRF\ (\text{m/Kg}) = (6.48 \times 10^{11}) - (4.57 \times 10^{10})X_1 + (2.16 \times 10^{10})X_2 - (2.3 \times 10^8)X_1^2 \quad (8)$$

Figure 11:
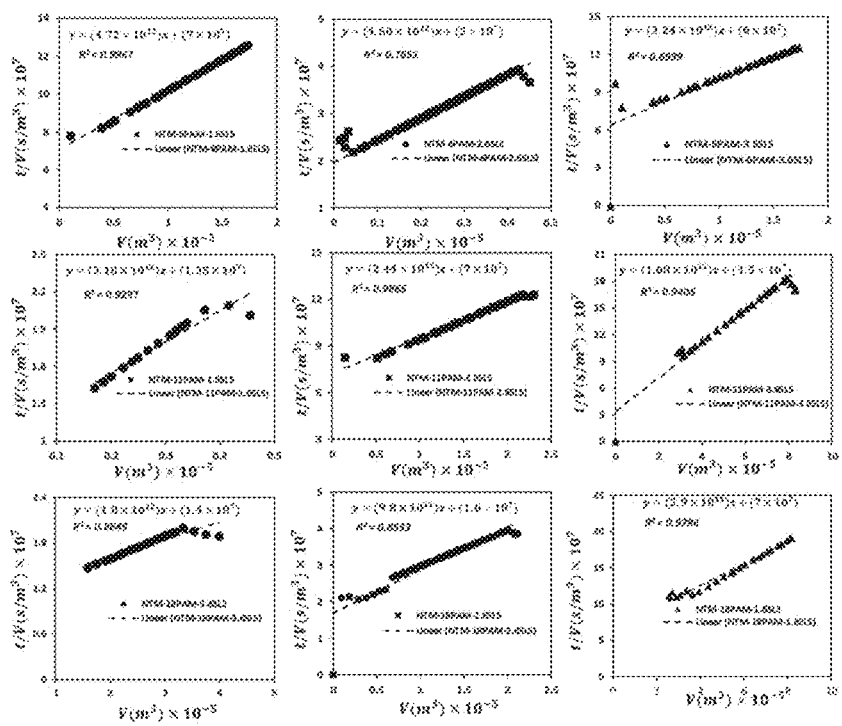
FIG. 11 Volume of the released water (V) against time/volume (t/V) (continues lines) together with their linearized relation (dash lines) obtained from the conducted flocculation tests with using the synthesized nanoflocculants.
Figure 12:
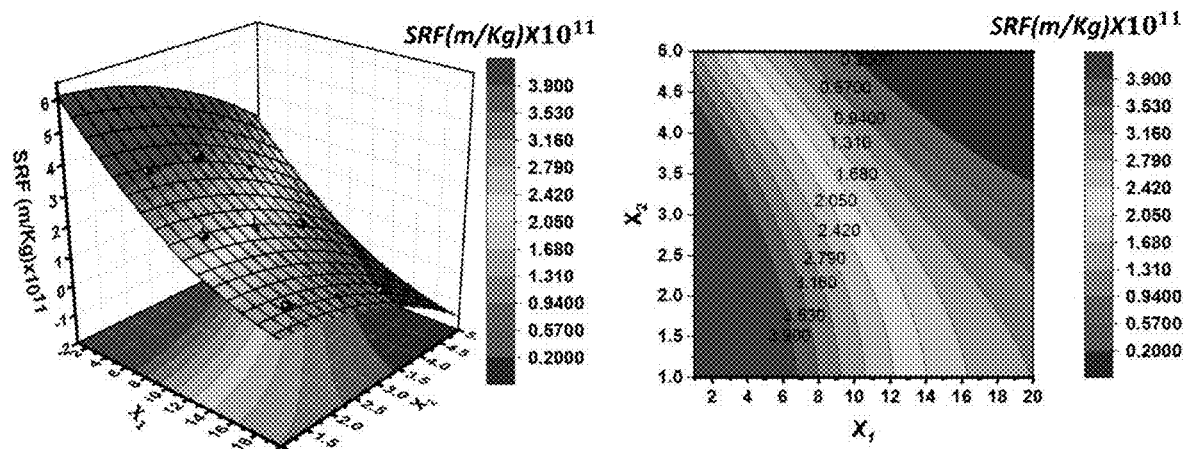
FIG. 12 (a) Surface response and (b) contour plots of SRF obtained under influence of applying various nanoflocculants generated from using various amounts of monomer (X1) and surfactant (X2) grafted on NTM nanoparticles.

The three-dimensional surface response and contour plots, given in FIGS. 11a,b, confirm that values of SRF can be reduced by enhancing the hydrophobic grafts resulted from varying the values of $X_1$ and $X_2$. The dewaterability of the sludge can be classified into easy or hard to dewater based on the obtained values of SRF.[44] In general, the sludges with SRF low values (<10$^{11}$ m/Kg) are considered as easy to dewater,[44] whereas sludges with high values of SRF (>10$^{11}$ m/Kg) are described as difficult to dewater.[44] Thus, introducing more hydrophobic grafts on the nanoflocculant can generate sediments with great tendency to release more water. Interestingly, our obtained values of SRF are much lower than those reported previously for dewatering of 5 wt % MFT with applying the dual polymeric flocculant of poly(DADMAC) and anionic (hydrolyzed) polyacrylamide (PAM) at dosage of 5000-20000 ppm.[18] Furthermore, flocculation of 2 wt % MFT with the use of high dosage of AC/DADMAC copolymers have generated flocs with SRF values $1.4 \times 10^{11} - 9.8 \times 10^{11}$ m/Kg.[18]

Scanning Electron Microscopy (SEM)

The compaction of the MFT sediments due to flocculating them with NTM-PAM/SLS was tested by the SEM analysis (FIG. 12a-d). Before flocculation, the lyophilized MFT sample (FIG. 12a,c) reveals a distinctive structure of stacked clay platelets (i.e., aluminum silicate layers), that are organized and interacted together by strong surface bonds. On the other hand, the lyophilized MFT sediments obtained from flocculating 15 wt % solids with 5000 ppm of NTM-PAM/SLS (NTM-18PAM-3.6SLS), shown in FIG. 12b,d, clearly exhibits less organized structure that might be resulted from overcoming the interfacial force between the stacked layers of clays. These nanoflocculants caused exfoliation of intercalated layers and contributed in "bridging" them together by the available hydrophobic grafts. Some researchers have recently tried to understand the nature of these bridges by studying the microstructural interaction between some clays like kaolinite and polymers and the main mechanism contributing in creating these bridges.[45,46] Kaolinite, as a main clay mineral presented in MFT, has anisotropic charge characteristic with edges and basal planes of phyllosilicates.[45,46] The basal planes consist of tetrahedral siloxane surface of Si—O—Si and octahedral aluminum oxy-hydroxyl (Al—O—OH) surface of Al—OH exposures.[47-49] The underlying mechanism involved in interaction between the organic polymer, as suggested by some early studies, resulted from forming hydrogen bonding between the polymer moieties and oxygen atoms on siloxane basal planes.[48,49] However, some authors have confirmed that the oxygen atoms are very weak electron donner and are not susceptible of participating in hydrogen bonding, such that the polymer moieties have great tendency to be bonded with exchangeable cations on clays surfaces through water bridges.[47] In more recent study, it has been proven that cationic PAM got adsorbed irreversibly and weakly on the tetrahedral silica basal planes, while anionic PAM strongly adsorbed on the aluminum-hydroxy basal planes, revealing that both electrostatic attraction and hydrogen bonding mechanisms are involved in the interaction between the polymer and kaolinite.[47]

Comparative Study

Figure 13:
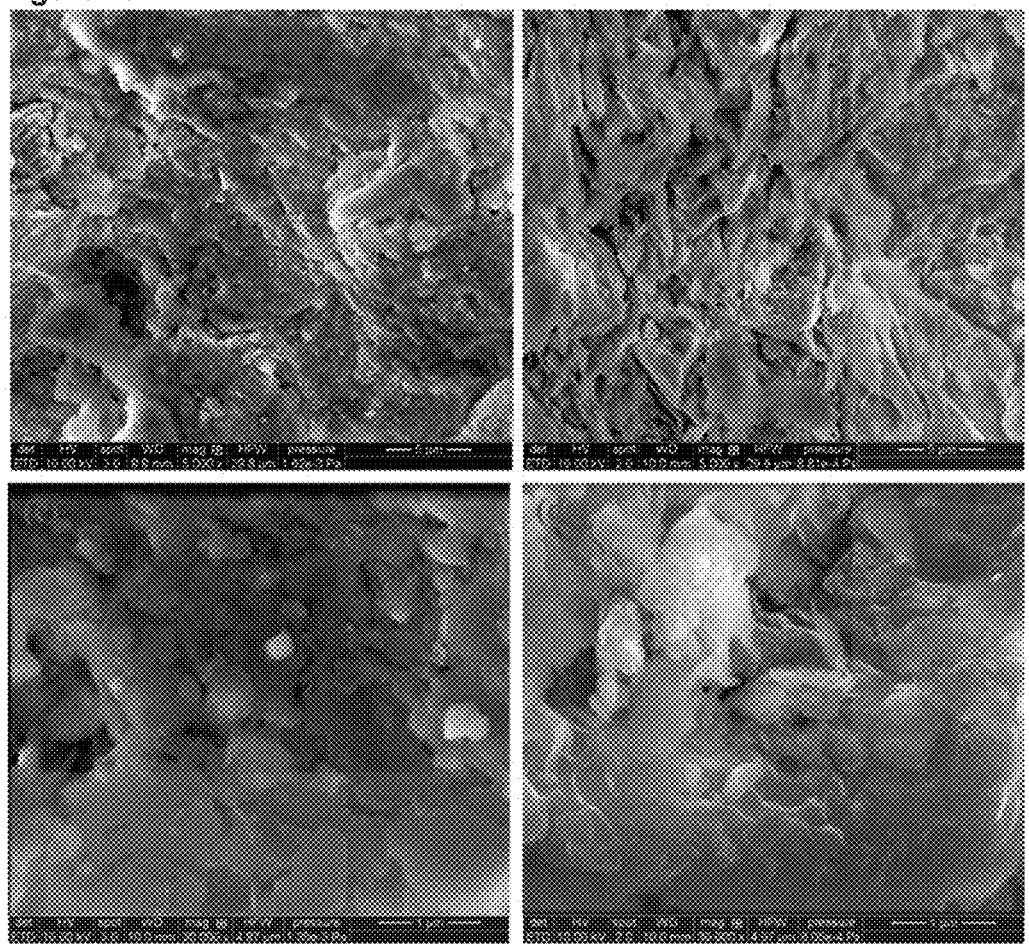
FIG. 13 SEM images of lyophilized raw samples of MFT (a and c) and MFT sediments obtained after flocculation with NTM-PAM/SLS (b and d). Line marks in the images correspond to 5 and 1 m, respectively.
Figure 14:
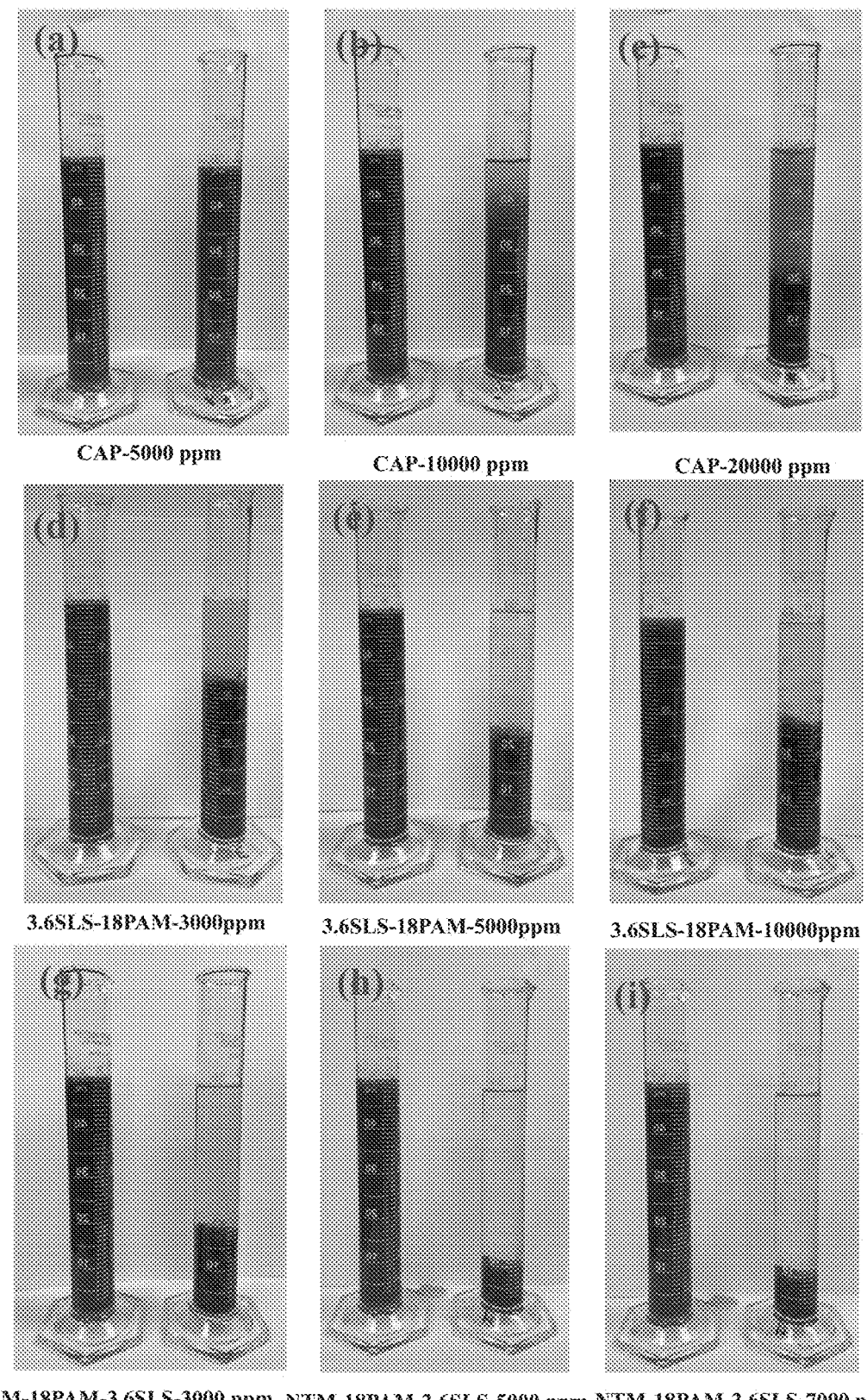
FIG. 14 Mudline heights recorded for the control MFT samples with 15 wt % solids (left hand sides) against the same samples after flocculation/settling (right hand sides) by using (a) 5000 ppm (24 h), (b)10000 ppm (24 h), and (c) 20000 ppm (24 h) of the commercial anionic PAM (CAP), comparing with using (d) 3000 ppm (24 h), (e) 5000 ppm (24 h), (f) and 10000 ppm (24 h) of 18PAM-3.6SLS without NTM nanoparticles, and with using (g) 3000 ppm (24 h), (h)5000 ppm, and (i) 7000 ppm of NTM-18PAM-3.6SLS.

For the sake of comparison, the effectiveness of our optimized nanoflocculants (NTM-18PAM-3.6SLS) towards enhancing settling and consolidation of MFT was proven by comparing its flocculation and settling behavior against a flocculant made by the same combination of PAM/SLS but without NTM nanoparticles and a commonly used commercial anionic PAM (CAP) flocculant. FIG. 13 shows the images of compact mudline heights after 24 h of the control MFT samples (15 wt % solids) before (left hand side samples) and after flocculation/settling (right hand side samples) applying various dosages of CAP (FIG. 13a-c), 18PAM-3.6SLS (FIG. 13d-f), and NTM-18PAM-3.6PAM (FIG. 13g-i). Like the control MFT samples, no mudline was observed after the duration of 24 h for the flocculated sample with the CAP at 5000 ppm (FIG. 13a). However, the flocculated samples with the same commercial flocculant at dosages of 10000 (FIG. 13b) and 20000 (FIG. 13c) ppm showed appearance of compact mudline that tend to be slightly reduced with enhancing the dosage. On the other hand, co-existing of PAM and SLS caused notable reduction in mudline levels with increasing the dosage from 3000 to 10000 ppm, as shown in FIG. 13d-f, respectively. These results confirmed the role of the SLS in decreasing the filter cake moisture content substantially. The PAM/SLS mixture after grafting with NTM showed a significant reduction in the compact mudline levels of the MFT with enhancing the dosage from 3000 to 7000 ppm as presented in FIGS. 13c-f, respectively. The flocculation behavior of the same samples was further investigated by testing their ISR, turbidity, CST, and SRF, as displayed in Table 4. The table clearly shows low flocculation performance of the MFT in presence of CAP (low values of ISRs, high turbidity measurements, high CSTs, and high SRF), even in presence of great dosages (i.e. 20000 ppm). In fact, the anionic PAM tends to have a low charge density which limits its tendency to neutralize the MFT particles and support flocculation of the particle. Therefore, to enhance the charge density, some researchers have suggested adding high dosages of metallic ions such as $Ca^{2+}$ or $Al^{3+}$ to the CAP, which may chelate the carboxylic acids of adjacent groups, that subsequently leads to neutralize the negatively charged kaolinite presented in the MFT.[18,30] Unfortunately, this method might generate less stable polymeric flocculants that tend to precipitate, which lower the flocculation efficiency. In contrary, the flocculation of MFT with the addition of 3000, 5000, and 10000 ppm of the PAM/SLS mixture, provided values of ISR as high as 2.5 cm/s, turbidity as low as 107 NTU, CSTs as low as 58 s, and SRF as low as $7.4 \times 10^{11}$ m/Kg. Notwithstanding, enhancing the dosage of the PAM/SLS up to 10000 ppm led to reduce the ISR to 1.75 cm/s and enhancing the supernatant turbidity, CST and SRF to values of 120 NTU, 69 s, and $9.4 \times 10^{11}$ m/Kg. These results support the previously reported findings in which the PAM/SLS contributed in enhancing the dewaterability of the kaolinite suspension by reducing the liquid surface tension and increasing the hydrophobicity up to a certain level of dosage.[32] After exceeding that level of dosage, PAM/SLS tend to re-stabilize the suspension, causing opposite effects.[32] In such system, there could be a mutual interaction between polymer and surfactant beside their interaction with the solid particles, which might lead to inappropriate grafting and forming polymer-aggregate complexes that produce undesirable froth during the flocculation.[32] These challenging issues were alleviated by our present study, such that more segments from the polymer/surfactant mixture were grafted on an active carrier (i.e., NTM nanoparticles), that is exists on the core structure of our nanoflocculant. In fact, the flocculation behavior with the addition of 3000, 5000, and 7000 ppm from our optimized nanoflocculants, provided values of ISR as high as 7.2 cm/s, turbidity as low as 39 NTU, CSTs as low as 18 s, and SRF as low as $2.4 \times 10^{10}$ m/Kg. Our nanoflocculant offers better exposure and performance, bridging and networking between polymer chains and clay particles with subsequent charge neutralization with far less PAM/SLS concentration. These positive results demonstrated and pointed out that our synthesized nanoflocculants are superior in comparison to the CAP and held an excellent flocculation and settling performance.

TABLE 4

Settling and dewatering performance results obtained for the MFT (15 wt % solids) after 24 h by applying the commercial anionic PAM (CAP) and the optimized nanoflocculant of NTM-PAM/SLS at various dosages.

| Sample name | Dosage (ppm) | ISR (cm/s) | Turbidity (NTU) | CST (s) | SRF (m/Kg) |
|---|---|---|---|---|---|
| CAP | 5000 | NA | NA | NA | NA |
|  | 10000 | 0.01 | 334 | 132 | $43.30 \times 10^{11}$ |
|  | 20000 | 0.30 | 188 | 86 | $12.43 \times 10^{11}$ |
| 18PAM-3.6SLS | 3000 | 0.32 | 295 | 87 | $12.5 \times 10^{11}$ |
|  | 5000 | 2.50 | 107 | 58 | $7.4 \times 10^{11}$ |
|  | 10000 | 1.75 | 120 | 69 | $9.4 \times 10^{11}$ |
| NTM-18PAM-3.6SLS | 3000 | 4.20 | 102 | 51 | $3.21 \times 10^{11}$ |
|  | 5000 | 7.00 | 42 | 23 | $2.5 \times 10^{10}$ |
|  | 7000 | 7.10 | 39 | 18 | $2.4 \times 10^{10}$ |

CONCLUSION

Destabilization of the solid particles presented in mature fine tailings (MFT) is the main factor that allows to enhance settling and consolidation. Cationic and hydrophobically modified organic polymers, alone or in conjunction with other inorganic agents, are most often used to destabilize these MFT particles and enhance the interactions among the fine particles by the charge neutralization. These polymeric flocculants are not capable to flocculate the fine particles effectively and had low tendency to generate large and porous flocs of high-water permeability. In this study, we demonstrated the synthesis of a novel nanoflocculant that is grafted with hydrophobically modified polyacrylamide with lauryl sulfate. The core structure of these nanoflocculants composed of titanomagnetite nanoparticles, which can be produced by coprecipitation method under ambient temperature. While grafting of polymeric/surfactant segments was done by anchoring the acrylamide, followed by free radical polymerization and subsequent grafting of lauryl sulfate. With varying the amount of monomer and surfactant in the synthesis, diverse nanoflocculants were generated to test the flocculation and consolidation of the MFT suspension (15 wt % solids). Response surface methodology (RSM) was used to investigate the effects of the grafting conditions on the flocculation behavior of the generated nanoflocculants by testing the responses of initial settling rate (ISR), supernatant turbidity, capillary suction time (CST) and surface resistance to filtration (SRF). Our statistical analysis showed that the used amounts of monomer and surfactant had the most significant effects on the settling and dewaterability of the generated nanoflocculants, such that the grafted nanoflocculants with more hydrophobic segments (i.e., PAM/SLS) can capture more solid particles presented in the MFT by interarticular bridging mechanism. Our optimized nanoflocculants, compared with many reported cationic copolymers, resulted in high ISR (7 cm/s), lower supernatant turbidity (<50), lower CST (<30), and lower SRF (<2.5× $10^{10}$ kg/m). To the best of our knowledge, the optimized nanoflocculants were tested against the anionic commercial polyacrylamide at different dosages and the results showed that lower dosages of our nanoflocculants (i.e., 3000 ppm) flocculated the MFT suspension sample 15 times faster than the commercial flocculant with dosage of 20000 ppm. Applying 3000 ppm of our nanoflocculants comparing to the commercial anionic flocculant reduced the supernatant turbidity, CST, and SRF to the half.

REFERENCES (1) Willis, C. E.; St. Louis, V. L.; Kirk, J. L.; St. Pierre, K. A.; Dodge, C. Tailings ponds of the Athabasca Oil Sands Region, Alberta, Canada, are likely not significant sources of total mercury and methylmercury to nearby ground and surface waters. *Sci. Total Environ.* 2019, 647, 1604-1610.

(2) Alberta Oil Sands Industry, 2015. Quarterly Update, Fall 2015, 18p. https://open.alberta.ca/publications/2614198.

(3) Canada, S. Oil Sands. *Tailings Mine Waste* 2010 2010, 339-339.

(4) Hajinasiri, J. Treatment of steam assisted gravity drainage praoduced water using polymeric membranes, University of Alberta, 2015.

(5) Igunnu, E. T.; Chen, G. Z. Produced water treatment technologies. 2018, No. July 2012.

(6) Heins, W.; Schooley, K. Achieving Zero Liquid Discharge in SAGD Heavy Oil Recovery. *J. Can. Pet. Technol.* 2004, 43 (8), 37-42.

(7) Cenovus Energy. Oil sands, Water Management. 2016, No. November 2013, 2014-2015.

(8) Avagyan, A. B. Environmental building policy by the use of microalgae and decreasing of risks for Canadian oil sand sector development. *Environ. Sci. Pollut. Res.* 2017, 24 (25), 20241-20253.

(9) Ma, L.; Huang, C.; Liu, Z. S. Predicting Naphthenic Acid Migration Through the Foundation of Oil Sands Tailing Pond. *Water. Air. Soil Pollut.* 2019, 230 (9).

(10) Allen, E. W. Process water treatment in Canada's oil sands industry: II. A review of emerging technologies. *J. Environ. Eng. Sci.* 2008, 7.5, 499-524.

(11) oil Sands Magazine https://www.oilsandsmagazine.com/technical/mining/extraction.

(12) Jeeravipoolvarn, S. Compression Behaviour of Thixotropic Oil Sands Tailings. *Can. Med. Assoc. J.* 2005, 247.

(13) Zhou, J. Z.; Li, H.; Chow, R. S.; Liu, Q.; Xu, Z.; Masliyah, J. Role of mineral flotation technology in improving bitumen extraction from mined Athabasca oil sands—II. Flotation hydrodynamics of water-based oil sand extraction. *Can. J. Chem. Eng.* 2020, 98 (1), 330-352.

(14) Wang, C.; Harbottle, D.; Liu, Q.; Xu, Z. Current state of fine mineral tailings treatment: A critical review on theory and practice. *Miner. Eng.* 2014, 58, 113-131.

(15) Allen, E. W. Process water treatment in Canada's oil sands industry: I. A review of emerging technologies. *J. Environ. Eng. Sci.* 2008, 7 (5), 499-524.

(16) Vedoy, D. R. L.; Soares, J. B. P. Water-soluble polymers for oil sands tailing treatment: A Review. *Can. J. Chem. Eng.* 2015, 93 (5), 888-904.

(17) Reis, L. G.; Oliveira, R. S.; Palhares, T. N.; Spinelli, L. S.; Lucas, E. F.; Vedoy, D. R. L.; Asare, E.; Soares, J. B. P. Using acrylamide/propylene oxide copolymers to dewater and densify mature fine tailings. *Miner. Eng.* 2016, 95, 29-39.

(18) Vajihinejad, V.; Guillermo, R.; Soares, J. B. P. Dewatering Oil Sands Mature Fine Tailings (MFTs) with Poly (acrylamide-co-diallyldimethylammonium chloride): Effect of Average Molecular Weight and Copolymer Composition. *Ind. Eng. Chem. Res.* 2017, 56 (5), 1256-1266.

(19) Zhang, D.; Thundat, T.; Narain, R. Flocculation and dewatering of mature fine tailings using temperature-responsive cationic polymers. *Langmuir* 2017, 33 (23), 5900-5909.

(20) Hripko, R.; Vajihinejad, V.; LopesMotta, F.; Soares, J. B. P. Enhanced Flocculation of Oil Sands Mature Fine Tailings Using Hydrophobically Modified Polyacrylamide Copolymers. *Glob. Challenges* 2018, 2 (3), 1700135.

(21) Gumfekar, S. P.; Rooney, T. R.; Hutchinson, R. A.; Soares, J. B. P. Dewatering Oil Sands Tailings with Degradable Polymer Flocculants. *ACS Appl. Mater. Interfaces* 2017, 9 (41), 36290-36300.

(22) Lister, K. C.; Kaminsky, H.; Hutchinson, R. A. Evaluation of a Novel Polymeric Flocculant for Enhanced Water Recovery of Mature Fine Tailings. *Processes* 2020, 8 (6), 735.

(23) Thompson, D. K.; Motta, F. L.; Soares, J. B. P. Investigation on the flocculation of oil sands mature fine tailings with alkoxysilanes. *Miner. Eng.* 2017, 111 (June), 90-99.

(24) Renault, S.; Lait, C.; Zwiazek, J. J.; MacKinnon, M. Effect of high salinity tailings waters produced from gypsum treatment of oil sands tailings on plants of the boreal forest. *Environ. Pollut.* 1998, 102 (2-3), 177-184.

(25) Salloum, M. J.; Dudas, M. J.; Fedorak, P. M. Microbial reduction of amended sulfate in anaerobic mature fine tailings from oil sand. *Waste Manag. Res.* 2002, 20 (2), 162-171.

(26) Matthews, J. G.; Shaw, W. H.; Mackinnon, M. D.; Cuddy, R. G. Development of composite tailings technology at Syncrude. *Int. J. Surf Mining, Reclam. Environ.* 2002, 16 (1), 24-39.

(27) Vedoy, D. R., & Soares, J. B. Water-soluble polymers for oil sands tailing treatment: A Review. *Can. J. Chem. Eng.* 2015, 93 (5), 888-904.

(28) Pennetta De Oliveira, L.; Gumfekar, S. P.; Lopes Motta, F.; Soares, J. B. P. Dewatering of Oil Sands Tailings with Novel Chitosan-Based Flocculants. *Energy and Fuels* 2018, 32 (4), 5271-5278.

(29) Liu, Y.; Lv, C.; Ding, J.; Qian, P.; Zhang, X.; Yu, Y.; Ye, S.; Chen, Y. The use of the organic-inorganic hybrid polymer $Al(OH)_3$-polyacrylamide to flocculate particles in the cyanide tailing suspensions. *Miner. Eng.* 2016, 89, 108-117.

(30) Alamgir, A.; Harbottle, D.; Masliyah, J.; Xu, Z. Al-PAM assisted filtration system for abatement of mature fine tailings. *Chem. Eng. Sci.* 2012, 80, 91-99.

(31) Qiao, Z.; Wang, Z.; Zhang, C.; Yuan, S.; Zhu, Y.; Wang, J. PVAm-PIP/PS composite membrane with high performance for $CO_2/N_2$ separation. *AIChE J.* 2012, 59 (4), 215-228.

(32) Besra, L.; Sengupta, D. K.; Roy, S. K.; Ay, P. Flocculation and dewatering of kaolin suspensions in the presence of polyacrylamide and surfactants. *Int. J. Miner. Process.* 2002, 66 (1-4), 203-232.

(33) Ball, R. D. Statistical Analysis and Experimental Design. In *Association mapping in plants;* 2007; pp 133-196.

(34) Hunkeler, D. Mechanism and Kinetics of the Persulfate-Initiated Polymerization of Acrylamide. *Macromolecules* 1991, 24 (9), 2160-2171.
(35) JADE V 7.5.1 XRD. Materials Data Inc 2005.
(36) Monshi, A.; Foroughi, M. R.; Monshi, M. R. Modified Scherrer equation to estimate more accurately nano-crystallite size using XRD. *World J. Nano Sci. Eng.* 2012, 2 (03), 154.
(37) Azarifar, D.; Badalkhani, O.; Abbasi, Y. Amino acid ionic liquid-based titanomagnetite nanoparticles: An efficient and green nanocatalyst for the synthesis of 1,4-dihydropyrano[2,3-c]pyrazoles. *Appl. Organomet. Chem.* 2018, 32 (1).
(38) Shaikh, S. H.; Kumar, S. A. Polyhydroxamic acid functionalized sorbent for effective removal of chromium from ground water and chromic acid cleaning bath. *Chem. Eng. J.* 2017, 326 (June), 318-328.
(39) Hethnawi, A.; Nassar, N. N.; Vitale, G. Preparation and characterization of poly(ethylenimine)-functionalized pyroxene nanoparticles and its application in wastewater treatment. *Colloids Surfaces A Physicochem. Eng. Asp.* 2017, 525, 20-30.
(40) Polymers, H. Head-to-Head Polymers*. 2000, 38, 4013-4022.
(41) Ahmad, A. L.; Wong, S. S.; Teng, T. T.; Zuhairi, A. Optimization of coagulation-flocculation process for pulp and paper mill effluent by response surface methodological analysis. *J. Hazard. Mater.* 2007, 145 (1-2), 162-168.
(42) Crittenden, J., Trusell, R., Hand, D., Howe, K., & Techobanoglous, G. *Water treatment principle and design;* 2005.
(43) Sawalha, O., & Scholz, M. Modeling the relationship between capillary suction time and specific resistance to filtration. *J. Environ. Eng.* 2010, 136 (9), 983-991.
(44) Crittenden, J., Trusell, R., Hand, D., Howe, K., & Techobanoglous, G. *Water Treatment: Principles and Design;* 2005.
(45) Deng, Y.; Dixon, J. B.; White, G. N. Adsorption of Polyacrylamide on Smectite, Illite, and Kaolinite. *Soil Sci. Soc. Am. J.* 2006, 70 (1), 297-304.
(46) Emerson, W. Complexes of calcium-montmorillonite with polymers. *Nature* 1960, 186, 573.
(47) Alagha, L.; Wang, S.; Yan, L.; Xu, Z.; Masliyah, J. Probing adsorption of polyacrylamide-based polymers on anisotropic basal planes of kaolinite using quartz crystal microbalance. *Langmuir* 2013, 29 (12), 3989-3998.
(48) Farmer, V. Characterization of adsorption bonds in clays by infrared spectroscopy. *Soil Sci.* 1971, 112 (62).
(49) Susko, F. An FT-IR study of calcium-exchanged montmorillonite treated with polyacrylamide and poly(ethylene oxide). *Miner. Met. Process.* 1990, 7, 206.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Terms such as "exemplary" or "exemplified" are used herein to mean "serving as an example, instance, or illustration." Any implementation described herein as "exemplary" or "exemplified" is accordingly not to be construed as necessarily preferred or advantageous over other implementations, all such implementations being independent embodiments. Unless otherwise stated, numeric ranges are inclusive of the numbers defining the range, and numbers are necessarily approximations to the given decimal. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification, and all documents cited in such documents and publications, are hereby incorporated herein by reference as if each individual publication were specifically and individually indicated to be incorporated by reference herein and as though fully set forth herein. The invention includes all embodiments and variations substantially as hereinbefore described and with reference to the examples and drawings.

The invention claimed is:

1. A flocculating agent comprising:
a metal oxide nanoparticle comprising a surface;
said surface comprising a negative charge;
acrylamide;
a hydrophilic segment;
a hydrophobic segment; and
sodium lauryl sulfate.

2. The flocculating agent of claim 1 wherein said acrylamide is polymerized to form polyacrylamide.

3. The flocculating agent of claim 1 wherein said acrylamide is cationic.

4. The flocculating agent of claim 1 wherein said acrylamide is anionic.

5. The flocculating agent of claim 1 wherein said sodium lauryl sulfate is anionic.

6. The flocculating agent of claim 1 wherein said acrylamide is associated with said surface of said metal oxide nanoparticle.

7. The flocculating agent of claim 2 wherein said polyacrylamide is associated with said surface of said metal oxide nanoparticle.

8. The flocculating agent of claim 1 wherein said sodium lauryl sulfate is associated with said surface of said metal oxide nanoparticle.

9. The flocculating agent of claim 2 wherein said sodium lauryl sulfate is associated with said acrylamide.

10. The flocculating agent of claim 1 wherein the metal oxide nanoparticle comprises titanomagnetite.

* * * * *